(12) United States Patent
Sinsabaugh et al.

(10) Patent No.: US 10,500,546 B2
(45) Date of Patent: Dec. 10, 2019

(54) PROCESSES FOR FORMING COMPOSITE STRUCTURES WITH A TWO-DIMENSIONAL MATERIAL USING A POROUS, NON-SACRIFICIAL SUPPORTING LAYER

(71) Applicant: LOCKHEED MARTIN CORPORATION, Bethesda, MD (US)

(72) Inventors: Steven Lloyd Sinsabaugh, Abingdon, MD (US); Peter V. Bedworth, Los Gatos, CA (US); David Francis Casey, Jr., Voorhees, NJ (US); Scott E. Heise, San Jose, CA (US); Steven W. Sinton, Palo Alto, CA (US); Randall Mark Stoltenberg, Palo Alto, CA (US); Jacob Louis Swett, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 102 days.

(21) Appl. No.: 14/609,325

(22) Filed: Jan. 29, 2015

(65) Prior Publication Data

US 2015/0217219 A1   Aug. 6, 2015

Related U.S. Application Data

(60) Provisional application No. 61/934,537, filed on Jan. 31, 2014.

(51) Int. Cl.
*B01D 67/00* (2006.01)
*B01D 69/10* (2006.01)
(Continued)

(52) U.S. Cl.
CPC ..... *B01D 67/0069* (2013.01); *B01D 67/0053* (2013.01); *B01D 67/0058* (2013.01);
(Continued)

(58) Field of Classification Search
CPC .... B01D 71/021; B01D 69/12; B01D 69/122; B01D 71/02; B82Y 40/00; B82Y 30/00
See application file for complete search history.

(56) References Cited

U.S. PATENT DOCUMENTS

| 2,187,417 A | 1/1940 | Doble |
| 3,024,153 A | 3/1962 | Kennedy |
(Continued)

FOREIGN PATENT DOCUMENTS

| CA | 2037988 | 9/1992 |
| CA | 2411935 | 12/2002 |
(Continued)

OTHER PUBLICATIONS

U.S. Appl. No. 14/193,007, filed Feb. 28, 2014.
(Continued)

*Primary Examiner* — Ana M Fortuna
(74) *Attorney, Agent, or Firm* — Foley & Lardner LLP

(57) ABSTRACT

It can be difficult to remove atomically thin films, such as graphene, graphene-based material and other two-dimensional materials, from a growth substrate and then to transfer the thin films to a secondary substrate. Tearing and conformality issues can arise during the removal and transfer processes. Processes for forming a composite structure by manipulating a two-dimensional material, such as graphene or graphene-base material, can include: providing a two-dimensional material adhered to a growth substrate; depositing a supporting layer on the two-dimensional material while the two-dimensional material is adhered to the growth substrate; and releasing the two-dimensional material from the growth substrate, the two-dimensional material remaining in contact with the supporting layer following release of the two-dimensional material from the growth substrate.

20 Claims, 7 Drawing Sheets

(51) Int. Cl.
*B01D 71/02* (2006.01)
*B01D 69/02* (2006.01)

(52) U.S. Cl.
CPC ........... B01D 69/10 (2013.01); B01D 71/021 (2013.01); *B01D 67/002* (2013.01); *B01D 67/003* (2013.01); *B01D 67/0004* (2013.01); *B01D 67/0034* (2013.01); *B01D 67/0037* (2013.01); *B01D 67/0062* (2013.01); *B01D 67/0072* (2013.01); *B01D 69/02* (2013.01); *B01D 2323/39* (2013.01); *B01D 2325/24* (2013.01)

(56) References Cited

U.S. PATENT DOCUMENTS

| | | | |
|---|---|---|---|
| 3,303,085 A | 2/1967 | Price et al. | |
| 3,501,831 A | 3/1970 | Gordon | |
| 3,593,854 A | 7/1971 | Swank | |
| 3,692,059 A | 9/1972 | Ice, Jr. | |
| 3,701,433 A | 10/1972 | Krakauer et al. | |
| 3,802,972 A | 4/1974 | Fleischer et al. | |
| 3,896,733 A | 7/1975 | Rosenberg | |
| 4,043,331 A * | 8/1977 | Martin | A61L 15/24 |
| | | | 602/45 |
| 4,073,732 A | 2/1978 | Lauer et al. | |
| 4,159,954 A | 7/1979 | Gangemi | |
| 4,162,220 A | 7/1979 | Servas | |
| 4,277,344 A | 7/1981 | Cadotte | |
| 4,303,530 A | 12/1981 | Shah et al. | |
| 4,457,747 A | 7/1984 | Tu | |
| 4,743,371 A | 5/1988 | Servas et al. | |
| 4,804,363 A | 2/1989 | Valeri | |
| 4,855,058 A | 8/1989 | Holland et al. | |
| 4,880,440 A | 11/1989 | Perrin | |
| 4,889,626 A | 12/1989 | Browne | |
| 4,891,134 A | 1/1990 | Vcelka | |
| 4,925,560 A | 5/1990 | Sorrick | |
| 4,935,207 A | 6/1990 | Stanbro et al. | |
| 4,976,858 A | 12/1990 | Kadoya | |
| 5,052,444 A | 10/1991 | Messerly et al. | |
| 5,080,770 A | 1/1992 | Culkin | |
| 5,082,476 A * | 1/1992 | Kahlbaugh | B01D 39/14 |
| | | | 55/320 |
| 5,156,628 A | 10/1992 | Kranz | |
| 5,182,111 A | 1/1993 | Aebischer et al. | |
| 5,185,086 A | 2/1993 | Kaali et al. | |
| 5,201,767 A | 4/1993 | Caldarise et al. | |
| 5,244,981 A | 9/1993 | Seidner et al. | |
| 5,277,748 A | 1/1994 | Sakaguchi et al. | |
| 5,314,492 A | 5/1994 | Hamilton et al. | |
| 5,314,960 A | 5/1994 | Spinelli et al. | |
| 5,314,961 A | 5/1994 | Anton et al. | |
| 5,331,067 A | 7/1994 | Seidner et al. | |
| 5,344,454 A | 9/1994 | Clarke et al. | |
| 5,371,147 A | 12/1994 | Spinelli et al. | |
| 5,425,858 A | 6/1995 | Farmer | |
| 5,480,449 A | 1/1996 | Hamilton et al. | |
| 5,514,181 A | 5/1996 | Light et al. | |
| 5,516,522 A | 5/1996 | Peyman et al. | |
| 5,549,697 A | 8/1996 | Caldarise | |
| 5,562,944 A | 10/1996 | Kafrawy | |
| 5,565,210 A | 10/1996 | Rosenthal et al. | |
| 5,580,530 A | 12/1996 | Kowatsch et al. | |
| 5,595,621 A | 1/1997 | Light et al. | |
| 5,636,437 A | 6/1997 | Kaschmitter et al. | |
| 5,639,275 A | 6/1997 | Baetge et al. | |
| 5,641,323 A | 6/1997 | Caldarise | |
| 5,658,334 A | 8/1997 | Caldarise et al. | |
| 5,662,158 A | 9/1997 | Caldarise | |
| 5,665,118 A | 9/1997 | Lasalle et al. | |
| 5,671,897 A | 9/1997 | Ogg et al. | |
| 5,679,232 A | 10/1997 | Fedor et al. | |
| 5,679,249 A | 10/1997 | Fendya et al. | |
| 5,687,788 A | 11/1997 | Caldarise et al. | |
| 5,700,477 A | 12/1997 | Rosenthal et al. | |
| 5,713,410 A | 2/1998 | Lasalle et al. | |
| 5,716,412 A | 2/1998 | Decarlo et al. | |
| 5,716,414 A | 2/1998 | Caldarise | |
| 5,725,586 A | 3/1998 | Sommerich | |
| 5,725,775 A | 3/1998 | Bene et al. | |
| 5,731,360 A | 3/1998 | Pekala et al. | |
| 5,733,503 A | 3/1998 | Kowatsch et al. | |
| 5,746,272 A | 5/1998 | Mastrorio et al. | |
| 5,782,286 A | 7/1998 | Sommerich | |
| 5,782,289 A | 7/1998 | Mastrorio et al. | |
| 5,788,916 A | 8/1998 | Caldarise | |
| 5,800,828 A | 9/1998 | Dionne et al. | |
| 5,808,312 A | 9/1998 | Fukuda | |
| 5,868,727 A | 2/1999 | Barr et al. | |
| 5,897,592 A | 4/1999 | Caldarise et al. | |
| 5,902,762 A | 5/1999 | Mercuri et al. | |
| 5,906,234 A | 5/1999 | Mastrorio et al. | |
| 5,910,172 A | 6/1999 | Penenberg | |
| 5,910,173 A | 6/1999 | Decarlo et al. | |
| 5,913,998 A | 6/1999 | Butler et al. | |
| 5,922,304 A | 7/1999 | Unger | |
| 5,925,247 A | 7/1999 | Huebbel | |
| 5,932,185 A | 8/1999 | Pekala et al. | |
| 5,935,084 A | 8/1999 | Southworth | |
| 5,935,172 A | 8/1999 | Ochoa et al. | |
| 5,954,937 A | 9/1999 | Farmer | |
| 5,974,973 A | 11/1999 | Tittgemeyer | |
| 5,976,555 A | 11/1999 | Liu et al. | |
| 5,980,718 A | 11/1999 | Van Konynenburg et al. | |
| 6,008,431 A | 12/1999 | Caldarise et al. | |
| 6,013,080 A | 1/2000 | Khalili | |
| 6,022,509 A | 2/2000 | Matthews et al. | |
| 6,052,608 A | 4/2000 | Young et al. | |
| 6,080,393 A | 6/2000 | Liu et al. | |
| 6,093,209 A | 7/2000 | Sanders | |
| 6,139,585 A | 10/2000 | Li | |
| 6,152,882 A | 11/2000 | Prutchi | |
| 6,156,323 A | 12/2000 | Verdicchio et al. | |
| 6,193,956 B1 | 2/2001 | Liu et al. | |
| 6,209,621 B1 | 4/2001 | Treacy | |
| 6,213,124 B1 | 4/2001 | Butterworth | |
| 6,228,123 B1 | 5/2001 | Dezzani | |
| 6,264,699 B1 | 7/2001 | Noiles et al. | |
| 6,292,704 B1 | 9/2001 | Malonek et al. | |
| 6,309,532 B1 | 10/2001 | Tran et al. | |
| 6,346,187 B1 | 2/2002 | Tran et al. | |
| 6,375,014 B1 | 4/2002 | Garcera et al. | |
| 6,423,022 B1 | 7/2002 | Roeher et al. | |
| 6,426,214 B1 | 7/2002 | Butler et al. | |
| 6,454,095 B1 | 9/2002 | Brisebois et al. | |
| 6,455,115 B1 | 9/2002 | Demeyer | |
| 6,461,622 B2 | 10/2002 | Liu et al. | |
| 6,462,935 B1 | 10/2002 | Shiue et al. | |
| 6,521,865 B1 | 2/2003 | Jones et al. | |
| 6,532,386 B2 | 3/2003 | Sun et al. | |
| 6,544,316 B2 | 4/2003 | Baker et al. | |
| 6,580,598 B2 | 6/2003 | Shiue et al. | |
| 6,654,229 B2 | 11/2003 | Yanagisawa et al. | |
| 6,659,298 B2 | 12/2003 | Wong | |
| 6,660,150 B2 | 12/2003 | Conlan et al. | |
| 6,661,643 B2 | 12/2003 | Shiue et al. | |
| 6,686,437 B2 | 2/2004 | Buchman et al. | |
| 6,692,627 B1 | 2/2004 | Russell et al. | |
| 6,695,880 B1 | 2/2004 | Roffman et al. | |
| 6,699,684 B2 | 3/2004 | Ho et al. | |
| 6,719,740 B2 | 4/2004 | Burnett et al. | |
| 6,905,612 B2 | 6/2005 | Dorian et al. | |
| 6,924,190 B2 | 8/2005 | Dennison | |
| 7,014,829 B2 | 3/2006 | Yanagisawa et al. | |
| 7,071,406 B2 | 7/2006 | Smalley et al. | |
| 7,092,753 B2 | 8/2006 | Darvish et al. | |
| 7,138,042 B2 | 11/2006 | Tran et al. | |
| 7,171,263 B2 | 1/2007 | Darvish et al. | |
| 7,175,783 B2 | 2/2007 | Curran | |
| 7,179,419 B2 | 2/2007 | Lin et al. | |
| 7,190,997 B1 | 3/2007 | Darvish et al. | |
| 7,267,753 B2 | 9/2007 | Anex et al. | |
| 7,306,768 B2 | 12/2007 | Chiga | |

(56) References Cited

U.S. PATENT DOCUMENTS

| | | |
|---|---|---|
| 7,357,255 B2 | 4/2008 | Ginsberg et al. |
| 7,374,677 B2 | 5/2008 | McLaughlin et al. |
| 7,381,707 B2 | 6/2008 | Lin et al. |
| 7,382,601 B2 | 6/2008 | Yoshimitsu |
| 7,434,692 B2 | 10/2008 | Ginsberg et al. |
| 7,452,547 B2 | 11/2008 | Lambino et al. |
| 7,459,121 B2 | 12/2008 | Liang et al. |
| 7,460,907 B1 | 12/2008 | Darvish et al. |
| 7,476,222 B2 | 1/2009 | Sun et al. |
| 7,477,939 B2 | 1/2009 | Sun et al. |
| 7,477,940 B2 | 1/2009 | Sun et al. |
| 7,477,941 B2 | 1/2009 | Sun et al. |
| 7,479,133 B2 | 1/2009 | Sun et al. |
| 7,505,250 B2 | 3/2009 | Cho et al. |
| 7,531,094 B2 | 5/2009 | McLaughlin et al. |
| 7,600,567 B2 | 10/2009 | Christopher et al. |
| 7,631,764 B2 | 12/2009 | Ginsberg et al. |
| 7,650,805 B2 | 1/2010 | Nauseda et al. |
| 7,674,477 B1 | 3/2010 | Schmid et al. |
| 7,706,128 B2 | 4/2010 | Bourcier |
| 7,732,301 B1 | 6/2010 | Pinnington et al. |
| 7,761,809 B2 | 7/2010 | Bukovec et al. |
| 7,786,086 B2 | 8/2010 | Reches et al. |
| 7,866,475 B2 | 1/2011 | Doskoczynski et al. |
| 7,875,293 B2 | 1/2011 | Shults et al. |
| 7,935,331 B2 | 5/2011 | Lin |
| 7,935,416 B2 | 5/2011 | Yang et al. |
| 7,943,167 B2 | 5/2011 | Kulkarni et al. |
| 7,960,708 B2 | 6/2011 | Wolfe et al. |
| 7,998,246 B2 | 8/2011 | Liu et al. |
| 8,109,893 B2 | 2/2012 | Lande |
| 8,147,599 B2 | 4/2012 | McAlister |
| 8,262,943 B2 | 9/2012 | Meng et al. |
| 8,278,106 B2 | 10/2012 | Martinson et al. |
| 8,308,702 B2 | 11/2012 | Batchvarova et al. |
| 8,316,865 B2 | 11/2012 | Ochs et al. |
| 8,329,476 B2 | 12/2012 | Pitkanen et al. |
| 8,354,296 B2 | 1/2013 | Dimitrakopoulos et al. |
| 8,361,321 B2 | 1/2013 | Stetson et al. |
| 8,449,504 B2 | 5/2013 | Carter et al. |
| 8,471,562 B2 | 6/2013 | Knizhnik |
| 8,475,689 B2 | 7/2013 | Sun et al. |
| 8,506,807 B2 | 8/2013 | Lee et al. |
| 8,512,669 B2 | 8/2013 | Hauck |
| 8,513,324 B2 | 8/2013 | Scales et al. |
| 8,535,726 B2 | 9/2013 | Dai et al. |
| 8,592,291 B2 | 11/2013 | Shi et al. |
| 8,617,411 B2 | 12/2013 | Singh |
| 8,666,471 B2 | 3/2014 | Rogers et al. |
| 8,686,249 B1 | 4/2014 | Whitaker et al. |
| 8,697,230 B2 | 4/2014 | Ago et al. |
| 8,698,481 B2 | 4/2014 | Lieber et al. |
| 8,715,329 B2 | 5/2014 | Robinson et al. |
| 8,721,074 B2 | 5/2014 | Pugh et al. |
| 8,734,421 B2 | 5/2014 | Sun et al. |
| 8,744,567 B2 | 6/2014 | Fassih et al. |
| 8,751,015 B2 | 6/2014 | Frewin et al. |
| 8,753,468 B2 | 6/2014 | Caldwell et al. |
| 8,759,153 B2 | 6/2014 | Elian et al. |
| 8,808,257 B2 | 8/2014 | Pugh et al. |
| 8,828,211 B2 | 9/2014 | Garaj et al. |
| 8,840,552 B2 | 9/2014 | Brauker et al. |
| 8,857,983 B2 | 10/2014 | Pugh et al. |
| 8,861,821 B2 | 10/2014 | Osumi |
| 8,894,201 B2 | 11/2014 | Pugh et al. |
| 8,940,552 B2 | 1/2015 | Pugh et al. |
| 8,950,862 B2 | 2/2015 | Pugh et al. |
| 8,974,055 B2 | 3/2015 | Pugh et al. |
| 8,975,121 B2 | 3/2015 | Pugh et al. |
| 8,979,978 B2 | 3/2015 | Miller et al. |
| 8,986,932 B2 | 3/2015 | Turner et al. |
| 8,993,234 B2 | 3/2015 | Turner et al. |
| 8,993,327 B2 | 3/2015 | McKnight et al. |
| 9,014,639 B2 | 4/2015 | Pugh et al. |
| 9,017,937 B1 | 4/2015 | Turner et al. |
| 9,023,220 B2 | 5/2015 | Zurutuza Elorza et al. |
| 9,028,663 B2 | 5/2015 | Stetson et al. |
| 9,035,282 B2 | 5/2015 | Dimitrakopoulos et al. |
| 9,045,847 B2 | 6/2015 | Batchvarova et al. |
| 9,050,452 B2 | 6/2015 | Sun et al. |
| 9,052,533 B2 | 6/2015 | Pugh et al. |
| 9,056,282 B2 | 6/2015 | Miller et al. |
| 9,062,180 B2 | 6/2015 | Scales et al. |
| 9,067,811 B1 | 6/2015 | Bennett et al. |
| 9,070,615 B2 | 6/2015 | Elian et al. |
| 9,075,009 B2 | 7/2015 | Kim et al. |
| 9,080,267 B2 | 7/2015 | Batchvarova et al. |
| 9,095,821 B1 | 8/2015 | Ratto et al. |
| 9,095,823 B2 | 8/2015 | Fleming |
| 9,096,050 B2 | 8/2015 | Bedell et al. |
| 9,096,437 B2 | 8/2015 | Tour et al. |
| 9,102,111 B2 | 8/2015 | Pugh et al. |
| 9,108,158 B2 | 8/2015 | Yu et al. |
| 9,110,310 B2 | 8/2015 | Pugh et al. |
| 9,125,715 B2 | 9/2015 | Pugh et al. |
| 9,134,546 B2 | 9/2015 | Pugh et al. |
| 9,156,700 B2 | 10/2015 | Zhamu et al. |
| 9,170,646 B2 | 10/2015 | Toner et al. |
| 9,185,486 B2 | 11/2015 | Pugh |
| 9,193,587 B2 | 11/2015 | Bennett |
| 9,195,075 B2 | 11/2015 | Pugh et al. |
| 9,225,375 B2 | 12/2015 | Pugh et al. |
| 9,388,048 B1 | 7/2016 | Zhou et al. |
| 9,425,709 B2 | 8/2016 | Hayashi et al. |
| 9,437,370 B2 | 9/2016 | Chen et al. |
| 9,463,421 B2 | 10/2016 | Fleming |
| 9,505,192 B2 | 11/2016 | Stoltenberg et al. |
| 9,545,600 B2 * | 1/2017 | Miller ............... B01D 67/0039 |
| 9,567,224 B2 | 2/2017 | Bedworth |
| 9,572,918 B2 | 2/2017 | Bachmann et al. |
| 9,592,475 B2 | 3/2017 | Stoltenberg et al. |
| 9,610,546 B2 | 4/2017 | Sinton et al. |
| 9,656,214 B2 * | 5/2017 | Miller .................... B01D 69/10 |
| 9,708,640 B2 * | 7/2017 | Wu ......................... C12Q 1/54 |
| 9,713,794 B2 | 7/2017 | Choi et al. |
| 9,742,001 B2 | 8/2017 | Zhamu et al. |
| 9,744,617 B2 * | 8/2017 | Bedworth ............... H01J 37/31 |
| 9,870,895 B2 | 1/2018 | Bedworth |
| 10,005,038 B2 | 6/2018 | Stetson, Jr. et al. |
| 10,017,852 B2 | 7/2018 | Heise |
| 10,096,679 B1 | 10/2018 | Antunez et al. |
| 10,118,130 B2 | 11/2018 | Swett |
| 10,124,299 B2 | 11/2018 | Kim et al. |
| 10,130,919 B1 | 11/2018 | Saleh |
| 2001/0036556 A1 | 11/2001 | Jen |
| 2001/0047157 A1 | 11/2001 | Burnett et al. |
| 2001/0055597 A1 | 12/2001 | Liu et al. |
| 2002/0079004 A1 | 6/2002 | Sato et al. |
| 2002/0079054 A1 | 6/2002 | Nakatani |
| 2002/0104435 A1 | 8/2002 | Baker et al. |
| 2002/0115957 A1 | 8/2002 | Sun et al. |
| 2002/0117659 A1 | 8/2002 | Lieber et al. |
| 2002/0183682 A1 | 12/2002 | Darvish et al. |
| 2002/0183686 A1 | 12/2002 | Darvish et al. |
| 2003/0052354 A1 | 3/2003 | Dennison |
| 2003/0134281 A1 | 7/2003 | Evans |
| 2003/0138777 A1 | 7/2003 | Evans |
| 2003/0146221 A1 | 8/2003 | Lauer et al. |
| 2003/0159985 A1 | 8/2003 | Siwy et al. |
| 2003/0171053 A1 | 9/2003 | Sanders |
| 2004/0018583 A1 | 1/2004 | Ho et al. |
| 2004/0035787 A1 | 2/2004 | Tanga et al. |
| 2004/0061253 A1 | 4/2004 | Kleinmeyer et al. |
| 2004/0063097 A1 | 4/2004 | Evans |
| 2004/0099324 A1 | 5/2004 | Fraser et al. |
| 2004/0111968 A1 | 6/2004 | Day et al. |
| 2004/0112865 A1 | 6/2004 | McCullough et al. |
| 2004/0121488 A1 | 6/2004 | Chang et al. |
| 2004/0140041 A1 | 7/2004 | Glick |
| 2004/0142463 A1 | 7/2004 | Walker et al. |
| 2004/0185730 A1 | 9/2004 | Lambino et al. |
| 2004/0193043 A1 | 9/2004 | Duchon et al. |
| 2004/0199243 A1 | 10/2004 | Yodfat |
| 2004/0208796 A1 | 10/2004 | Chiga |

(56) References Cited

U.S. PATENT DOCUMENTS

| | | |
|---|---|---|
| 2004/0217036 A1 | 11/2004 | Ginsberg et al. |
| 2004/0241214 A1 | 12/2004 | Kirkwood et al. |
| 2004/0251136 A1 | 12/2004 | Lean et al. |
| 2005/0004508 A1 | 1/2005 | Sun et al. |
| 2005/0004509 A1 | 1/2005 | Sun et al. |
| 2005/0004550 A1 | 1/2005 | Sun et al. |
| 2005/0010161 A1 | 1/2005 | Sun et al. |
| 2005/0010192 A1 | 1/2005 | Sun et al. |
| 2005/0015042 A1 | 1/2005 | Sun et al. |
| 2005/0053563 A1 | 3/2005 | Manissier et al. |
| 2005/0112078 A1 | 5/2005 | Boddupalli et al. |
| 2005/0126966 A1 | 6/2005 | Tanida et al. |
| 2005/0129633 A1 | 6/2005 | Lin |
| 2005/0148996 A1 | 7/2005 | Sun et al. |
| 2005/0170089 A1 | 8/2005 | Lashmore et al. |
| 2005/0189673 A1 | 9/2005 | Klug et al. |
| 2005/0226834 A1 | 10/2005 | Lambino et al. |
| 2005/0238730 A1 | 10/2005 | Le Fur et al. |
| 2006/0005381 A1 | 1/2006 | Nishi et al. |
| 2006/0036332 A1 | 2/2006 | Jennings |
| 2006/0073370 A1 | 4/2006 | Krusic et al. |
| 2006/0093885 A1 | 5/2006 | Krusic et al. |
| 2006/0121279 A1 | 6/2006 | Petrik |
| 2006/0151382 A1 | 7/2006 | Petrik |
| 2006/0166347 A1 | 7/2006 | Faulstich et al. |
| 2006/0180604 A1 | 8/2006 | Ginsberg et al. |
| 2006/0222701 A1 | 10/2006 | Kulkarni et al. |
| 2006/0253078 A1 | 11/2006 | Wu et al. |
| 2007/0004640 A1 | 1/2007 | Lin et al. |
| 2007/0032054 A1 | 2/2007 | Ramaswamy et al. |
| 2007/0056894 A1 | 3/2007 | Connors, Jr. |
| 2007/0060862 A1 | 3/2007 | Sun et al. |
| 2007/0062856 A1 | 3/2007 | Pahl et al. |
| 2007/0099813 A1 | 5/2007 | Luizzi et al. |
| 2007/0131646 A1 | 6/2007 | Donnelly et al. |
| 2007/0284279 A1 | 12/2007 | Doskoczynski et al. |
| 2008/0017564 A1 | 1/2008 | Hammond |
| 2008/0035484 A1 | 2/2008 | Wu et al. |
| 2008/0035541 A1 | 2/2008 | Franzreb et al. |
| 2008/0045877 A1 | 2/2008 | Levin et al. |
| 2008/0061477 A1 | 3/2008 | Capizzo |
| 2008/0063585 A1 | 3/2008 | Smalley et al. |
| 2008/0081323 A1 | 4/2008 | Keeley et al. |
| 2008/0081362 A1 | 4/2008 | Keeley et al. |
| 2008/0149561 A1 | 6/2008 | Chu et al. |
| 2008/0156648 A1 | 7/2008 | Dudziak et al. |
| 2008/0170982 A1 | 7/2008 | Zhang et al. |
| 2008/0185293 A1 | 8/2008 | Klose et al. |
| 2008/0188836 A1 | 8/2008 | Weber et al. |
| 2008/0190508 A1 | 8/2008 | Booth et al. |
| 2008/0241085 A1 | 10/2008 | Lin et al. |
| 2008/0268016 A1 | 10/2008 | Fang et al. |
| 2008/0290020 A1 | 11/2008 | Marand et al. |
| 2008/0290111 A1 | 11/2008 | Ginsberg et al. |
| 2009/0023572 A1 | 1/2009 | Backes et al. |
| 2009/0032475 A1* | 2/2009 | Ferrer .................. B01D 17/10 210/799 |
| 2009/0039019 A1 | 2/2009 | Raman |
| 2009/0048685 A1 | 2/2009 | Frigstad et al. |
| 2009/0075371 A1 | 3/2009 | Keeley et al. |
| 2009/0078640 A1* | 3/2009 | Chu .................. B01D 67/0013 210/321.6 |
| 2009/0087395 A1 | 4/2009 | Lin et al. |
| 2009/0117335 A1 | 5/2009 | Iyoda et al. |
| 2009/0120873 A1 | 5/2009 | Becker et al. |
| 2009/0148495 A1 | 6/2009 | Hammer et al. |
| 2009/0176159 A1 | 7/2009 | Zhamu et al. |
| 2009/0222072 A1 | 9/2009 | Robinson et al. |
| 2009/0236295 A1 | 9/2009 | Braun et al. |
| 2009/0241242 A1 | 10/2009 | Beatty et al. |
| 2009/0283475 A1 | 11/2009 | Hylton et al. |
| 2009/0291270 A1 | 11/2009 | Zettl et al. |
| 2009/0294300 A1 | 12/2009 | Kanzius et al. |
| 2009/0306364 A1 | 12/2009 | Beer et al. |
| 2010/0000754 A1 | 1/2010 | Mann et al. |
| 2010/0016778 A1 | 1/2010 | Chattopadhyay |
| 2010/0021708 A1 | 1/2010 | Kong et al. |
| 2010/0024722 A1 | 2/2010 | Ochs et al. |
| 2010/0024838 A1 | 2/2010 | Ochs et al. |
| 2010/0025330 A1 | 2/2010 | Ratto et al. |
| 2010/0055464 A1 | 3/2010 | Sung |
| 2010/0059378 A1 | 3/2010 | Elson et al. |
| 2010/0072643 A1 | 3/2010 | Pugh et al. |
| 2010/0076553 A1 | 3/2010 | Pugh et al. |
| 2010/0098741 A1 | 4/2010 | Ranade |
| 2010/0105834 A1 | 4/2010 | Tour et al. |
| 2010/0110372 A1 | 5/2010 | Pugh et al. |
| 2010/0124564 A1 | 5/2010 | Martinson et al. |
| 2010/0127312 A1 | 5/2010 | Grebel et al. |
| 2010/0161014 A1 | 6/2010 | Lynch et al. |
| 2010/0167551 A1 | 7/2010 | Dedontney |
| 2010/0196439 A1 | 8/2010 | Beck et al. |
| 2010/0209330 A1 | 8/2010 | Golzhauser et al. |
| 2010/0209515 A1 | 8/2010 | Chantalat et al. |
| 2010/0213079 A1 | 8/2010 | Willis |
| 2010/0224555 A1 | 9/2010 | Hoek et al. |
| 2010/0228204 A1 | 9/2010 | Beatty et al. |
| 2010/0233781 A1 | 9/2010 | Bangera et al. |
| 2010/0249273 A1 | 9/2010 | Scales et al. |
| 2010/0258111 A1 | 10/2010 | Shah et al. |
| 2010/0323177 A1 | 12/2010 | Ruoff et al. |
| 2010/0327847 A1 | 12/2010 | Leiber et al. |
| 2011/0014217 A1 | 1/2011 | Fahmy et al. |
| 2011/0027599 A1 | 2/2011 | Hoek et al. |
| 2011/0037033 A1 | 2/2011 | Green et al. |
| 2011/0041519 A1 | 2/2011 | McAlister |
| 2011/0041687 A1 | 2/2011 | Diaz et al. |
| 2011/0045523 A1 | 2/2011 | Strano et al. |
| 2011/0054418 A1 | 3/2011 | Pugh et al. |
| 2011/0054576 A1 | 3/2011 | Robinson et al. |
| 2011/0056892 A1 | 3/2011 | Lancaster |
| 2011/0073563 A1 | 3/2011 | Chang et al. |
| 2011/0092054 A1 | 4/2011 | Seo et al. |
| 2011/0092949 A1 | 4/2011 | Wang |
| 2011/0100921 A1 | 5/2011 | Heinrich |
| 2011/0112484 A1 | 5/2011 | Carter et al. |
| 2011/0118655 A1 | 5/2011 | Fassih et al. |
| 2011/0120970 A1 | 5/2011 | Joo et al. |
| 2011/0124253 A1 | 5/2011 | Shah et al. |
| 2011/0132834 A1* | 6/2011 | Tomioka .................. B01D 69/125 210/490 |
| 2011/0139707 A1 | 6/2011 | Siwy et al. |
| 2011/0152795 A1 | 6/2011 | Aledo et al. |
| 2011/0186449 A1 | 8/2011 | Clochard et al. |
| 2011/0189440 A1 | 8/2011 | Appleby et al. |
| 2011/0201201 A1 | 8/2011 | Arnold et al. |
| 2011/0202201 A1 | 8/2011 | Matsubara |
| 2011/0253630 A1 | 10/2011 | Bakajin et al. |
| 2011/0258791 A1 | 10/2011 | Batchvarova et al. |
| 2011/0258796 A1 | 10/2011 | Batchvarova et al. |
| 2011/0262645 A1 | 10/2011 | Batchvarova et al. |
| 2011/0263912 A1 | 10/2011 | Miller et al. |
| 2011/0269920 A1 | 11/2011 | Min et al. |
| 2012/0000845 A1 | 1/2012 | Park et al. |
| 2012/0031833 A1 | 2/2012 | Ho et al. |
| 2012/0048804 A1 | 3/2012 | Stetson et al. |
| 2012/0115243 A1 | 5/2012 | Pitkanen et al. |
| 2012/0116228 A1 | 5/2012 | Okubo |
| 2012/0145548 A1 | 6/2012 | Sivan et al. |
| 2012/0148633 A1 | 6/2012 | Sun et al. |
| 2012/0162600 A1 | 6/2012 | Pugh et al. |
| 2012/0183738 A1 | 7/2012 | Zettl et al. |
| 2012/0186850 A1 | 7/2012 | Sugiyama et al. |
| 2012/0211367 A1 | 8/2012 | Vecitis |
| 2012/0218508 A1 | 8/2012 | Pugh et al. |
| 2012/0219203 A1 | 8/2012 | Adachi |
| 2012/0220053 A1 | 8/2012 | Lee et al. |
| 2012/0234453 A1 | 9/2012 | Pugh et al. |
| 2012/0234679 A1 | 9/2012 | Garaj et al. |
| 2012/0235277 A1 | 9/2012 | Pugh et al. |
| 2012/0236254 A1 | 9/2012 | Pugh et al. |
| 2012/0236524 A1 | 9/2012 | Pugh et al. |
| 2012/0241371 A1 | 9/2012 | Revanur et al. |
| 2012/0242953 A1 | 9/2012 | Pugh et al. |

(56) References Cited

U.S. PATENT DOCUMENTS

| | | |
|---|---|---|
| 2012/0255899 A1 | 10/2012 | Choi et al. |
| 2012/0267337 A1 | 10/2012 | Striemer et al. |
| 2012/0292245 A1 | 11/2012 | Saito |
| 2012/0294793 A1 | 11/2012 | Chen et al. |
| 2012/0298396 A1 | 11/2012 | Hong et al. |
| 2012/0301707 A1 | 11/2012 | Kinloch et al. |
| 2013/0015136 A1 | 1/2013 | Bennett et al. |
| 2013/0034760 A1 | 2/2013 | Otts et al. |
| 2013/0045523 A1 | 2/2013 | Leach et al. |
| 2013/0056367 A1 | 3/2013 | Martinez et al. |
| 2013/0071941 A1 | 3/2013 | Miller |
| 2013/0096292 A1 | 4/2013 | Brahmasandra et al. |
| 2013/0100436 A1 | 4/2013 | Jackson et al. |
| 2013/0105417 A1 | 5/2013 | Stetson et al. |
| 2013/0108839 A1 | 5/2013 | Arnold et al. |
| 2013/0116541 A1 | 5/2013 | Gracias et al. |
| 2013/0131214 A1 | 5/2013 | Scales et al. |
| 2013/0135578 A1 | 5/2013 | Pugh et al. |
| 2013/0146221 A1 | 6/2013 | Kolmakov et al. |
| 2013/0146480 A1 | 6/2013 | Garaj et al. |
| 2013/0152386 A1 | 6/2013 | Pandojirao-S et al. |
| 2013/0174968 A1 | 7/2013 | Vlassiouk et al. |
| 2013/0174978 A1 | 7/2013 | Pugh et al. |
| 2013/0176030 A1 | 7/2013 | Simon |
| 2013/0190476 A1 | 7/2013 | Lancaster et al. |
| 2013/0192460 A1 | 8/2013 | Miller et al. |
| 2013/0192461 A1* | 8/2013 | Miller .................. B01D 67/0039 95/47 |
| 2013/0194540 A1 | 8/2013 | Pugh et al. |
| 2013/0213568 A1 | 8/2013 | Pugh et al. |
| 2013/0215377 A1 | 8/2013 | Pugh et al. |
| 2013/0215378 A1 | 8/2013 | Pugh et al. |
| 2013/0215380 A1 | 8/2013 | Pugh et al. |
| 2013/0216581 A1 | 8/2013 | Fahmy et al. |
| 2013/0240355 A1 | 9/2013 | Ho et al. |
| 2013/0240437 A1 | 9/2013 | Rodrigues et al. |
| 2013/0248097 A1 | 9/2013 | Ploss, Jr. |
| 2013/0248367 A1 | 9/2013 | Stetson et al. |
| 2013/0249147 A1 | 9/2013 | Bedworth |
| 2013/0256118 A1 | 10/2013 | Meller et al. |
| 2013/0256139 A1 | 10/2013 | Peng |
| 2013/0256154 A1 | 10/2013 | Peng |
| 2013/0256210 A1 | 10/2013 | Fleming |
| 2013/0256211 A1 | 10/2013 | Fleming |
| 2013/0261568 A1 | 10/2013 | Martinson et al. |
| 2013/0269819 A1 | 10/2013 | Ruby et al. |
| 2013/0270188 A1 | 10/2013 | Karnik et al. |
| 2013/0273288 A1 | 10/2013 | Luo et al. |
| 2013/0277305 A1 | 10/2013 | Stetson et al. |
| 2013/0277573 A1* | 10/2013 | Miller .................. H01J 37/20 250/440.11 |
| 2013/0284665 A1 | 10/2013 | Lee et al. |
| 2013/0295150 A1 | 11/2013 | Chantalat et al. |
| 2013/0295374 A1 | 11/2013 | Tang et al. |
| 2013/0309776 A1 | 11/2013 | Drndic et al. |
| 2013/0317131 A1 | 11/2013 | Scales et al. |
| 2013/0317132 A1 | 11/2013 | Scales et al. |
| 2013/0317133 A1 | 11/2013 | Scales et al. |
| 2013/0323295 A1 | 12/2013 | Scales et al. |
| 2013/0330833 A1 | 12/2013 | Ruiz et al. |
| 2013/0335092 A1 | 12/2013 | Wu |
| 2013/0338611 A1 | 12/2013 | Pugh et al. |
| 2013/0338744 A1 | 12/2013 | Frewin et al. |
| 2014/0002788 A1 | 1/2014 | Otts et al. |
| 2014/0005514 A1 | 1/2014 | Pugh et al. |
| 2014/0015160 A1 | 1/2014 | Kung et al. |
| 2014/0017322 A1 | 1/2014 | Dai et al. |
| 2014/0021133 A1 | 1/2014 | Siwy et al. |
| 2014/0030482 A1 | 1/2014 | Miller et al. |
| 2014/0048411 A1 | 2/2014 | Choi et al. |
| 2014/0066958 A1 | 3/2014 | Priewe |
| 2014/0079936 A1 | 3/2014 | Russo et al. |
| 2014/0093728 A1 | 4/2014 | Shah et al. |
| 2014/0128891 A1 | 5/2014 | Astani-Matthies et al. |
| 2014/0141521 A1 | 5/2014 | Peng et al. |
| 2014/0151288 A1* | 6/2014 | Miller .................. B01D 69/10 210/497.01 |
| 2014/0151631 A1 | 6/2014 | Duesberg et al. |
| 2014/0154464 A1 | 6/2014 | Miller et al. |
| 2014/0170195 A1 | 6/2014 | Fassih et al. |
| 2014/0171541 A1 | 6/2014 | Scales et al. |
| 2014/0174927 A1 | 6/2014 | Bashir et al. |
| 2014/0190004 A1 | 7/2014 | Riall et al. |
| 2014/0190550 A1 | 7/2014 | Loh et al. |
| 2014/0190676 A1 | 7/2014 | Zhamu et al. |
| 2014/0190833 A1 | 7/2014 | Lieber et al. |
| 2014/0192313 A1 | 7/2014 | Riall et al. |
| 2014/0192314 A1 | 7/2014 | Riall et al. |
| 2014/0199777 A2 | 7/2014 | Ruiz et al. |
| 2014/0209539 A1 | 7/2014 | El Badawi et al. |
| 2014/0212596 A1 | 7/2014 | Jahangiri-Famenini |
| 2014/0230653 A1 | 8/2014 | Yu et al. |
| 2014/0230733 A1 | 8/2014 | Miller |
| 2014/0231351 A1 | 8/2014 | Wickramasinghe et al. |
| 2014/0248621 A1 | 9/2014 | Collins |
| 2014/0253131 A1 | 9/2014 | Liu et al. |
| 2014/0257348 A1 | 9/2014 | Priewe et al. |
| 2014/0257515 A1 | 9/2014 | So et al. |
| 2014/0257517 A1 | 9/2014 | Deichmann et al. |
| 2014/0259657 A1 | 9/2014 | Riall et al. |
| 2014/0261999 A1 | 9/2014 | Stetson et al. |
| 2014/0263035 A1 | 9/2014 | Stoltenberg et al. |
| 2014/0263178 A1 | 9/2014 | Sinton et al. |
| 2014/0264977 A1 | 9/2014 | Pugh et al. |
| 2014/0268015 A1 | 9/2014 | Riall et al. |
| 2014/0268020 A1 | 9/2014 | Pugh et al. |
| 2014/0268021 A1 | 9/2014 | Pugh et al. |
| 2014/0268026 A1 | 9/2014 | Pugh et al. |
| 2014/0272286 A1 | 9/2014 | Stoltenberg et al. |
| 2014/0272522 A1 | 9/2014 | Pugh et al. |
| 2014/0273315 A1 | 9/2014 | Pugh et al. |
| 2014/0273316 A1 | 9/2014 | Pugh et al. |
| 2014/0276481 A1 | 9/2014 | Pugh et al. |
| 2014/0276999 A1 | 9/2014 | Harms et al. |
| 2014/0306361 A1 | 10/2014 | Pugh et al. |
| 2014/0308681 A1 | 10/2014 | Strano et al. |
| 2014/0311967 A1 | 10/2014 | Grossman et al. |
| 2014/0315213 A1 | 10/2014 | Nagrath et al. |
| 2014/0318373 A1 | 10/2014 | Wood et al. |
| 2014/0322518 A1 | 10/2014 | Addleman et al. |
| 2014/0333892 A1 | 11/2014 | Pugh et al. |
| 2014/0335661 A1 | 11/2014 | Pugh et al. |
| 2014/0343580 A1 | 11/2014 | Priewe |
| 2014/0346081 A1 | 11/2014 | Sowden et al. |
| 2014/0346631 A1 | 11/2014 | Karim et al. |
| 2014/0349892 A1 | 11/2014 | Van Der Zaag et al. |
| 2014/0350372 A1 | 11/2014 | Pugh et al. |
| 2014/0377651 A1 | 12/2014 | Kwon et al. |
| 2014/0377738 A1 | 12/2014 | Bachmann et al. |
| 2015/0015843 A1 | 1/2015 | Pugh et al. |
| 2015/0017918 A1 | 1/2015 | Pugh et al. |
| 2015/0050734 A1 | 2/2015 | Liedtke et al. |
| 2015/0053627 A1* | 2/2015 | Silin .................. B01D 29/00 210/767 |
| 2015/0057762 A1 | 2/2015 | Harms et al. |
| 2015/0061990 A1 | 3/2015 | Toner et al. |
| 2015/0062533 A1 | 3/2015 | Toner et al. |
| 2015/0063605 A1 | 3/2015 | Pugh |
| 2015/0066063 A1 | 3/2015 | Priewe |
| 2015/0075667 A1 | 3/2015 | McHugh et al. |
| 2015/0076056 A1 | 3/2015 | Iyuke et al. |
| 2015/0077658 A1 | 3/2015 | Pugh et al. |
| 2015/0077659 A1 | 3/2015 | Pugh et al. |
| 2015/0077660 A1 | 3/2015 | Pugh et al. |
| 2015/0077661 A1 | 3/2015 | Pugh et al. |
| 2015/0077662 A1 | 3/2015 | Pugh et al. |
| 2015/0077663 A1 | 3/2015 | Pugh et al. |
| 2015/0077699 A1 | 3/2015 | De Sio et al. |
| 2015/0077702 A9 | 3/2015 | Pugh et al. |
| 2015/0079683 A1 | 3/2015 | Yager et al. |
| 2015/0087249 A1 | 3/2015 | Pugh et al. |
| 2015/0096935 A1 | 4/2015 | Mitra et al. |
| 2015/0098910 A1 | 4/2015 | Mordas et al. |
| 2015/0101931 A1 | 4/2015 | Garaj et al. |

(56) References Cited

U.S. PATENT DOCUMENTS

| | | |
|---|---|---|
| 2015/0105686 A1 | 4/2015 | Vasan |
| 2015/0118318 A1 | 4/2015 | Fahmy et al. |
| 2015/0122727 A1 | 5/2015 | Karnik et al. |
| 2015/0137817 A1 | 5/2015 | Wilson et al. |
| 2015/0138454 A1 | 5/2015 | Pugh et al. |
| 2015/0142107 A1 | 5/2015 | Pugh et al. |
| 2015/0145155 A1 | 5/2015 | Pugh et al. |
| 2015/0146162 A1 | 5/2015 | Pugh et al. |
| 2015/0147474 A1 | 5/2015 | Batchvarova et al. |
| 2015/0151254 A1 | 6/2015 | Perez |
| 2015/0170788 A1 | 6/2015 | Miller et al. |
| 2015/0174253 A1 | 6/2015 | Sun et al. |
| 2015/0174254 A1 | 6/2015 | Sun et al. |
| 2015/0182473 A1 | 7/2015 | Bosnyak et al. |
| 2015/0185180 A1 | 7/2015 | Ruhl et al. |
| 2015/0196579 A1 | 7/2015 | Ferrante et al. |
| 2015/0196879 A1 | 7/2015 | Brinke-Seiferth et al. |
| 2015/0202351 A1 | 7/2015 | Kaplan et al. |
| 2015/0212339 A1 | 7/2015 | Pugh et al. |
| 2015/0217219 A1* | 8/2015 | Sinsabaugh ........ B01D 46/0001 210/489 |
| 2015/0218210 A1 | 8/2015 | Stetson et al. |
| 2015/0221474 A1 | 8/2015 | Bedworth et al. |
| 2015/0231557 A1* | 8/2015 | Miller ................ B01D 53/229 95/45 |
| 2015/0231577 A1 | 8/2015 | Nair et al. |
| 2015/0247178 A1 | 9/2015 | Mountcastle et al. |
| 2015/0248972 A1 | 9/2015 | Tang et al. |
| 2015/0258254 A1 | 9/2015 | Simon et al. |
| 2015/0258498 A1 | 9/2015 | Simon et al. |
| 2015/0258502 A1* | 9/2015 | Turowski ............... B01D 69/12 210/650 |
| 2015/0258503 A1* | 9/2015 | Sinton ................... B01D 69/12 95/49 |
| 2015/0258506 A1 | 9/2015 | Mi et al. |
| 2015/0258525 A1 | 9/2015 | Westman et al. |
| 2015/0268150 A1 | 9/2015 | Newkirk et al. |
| 2015/0272834 A1 | 10/2015 | Sun et al. |
| 2015/0272896 A1 | 10/2015 | Sun et al. |
| 2015/0273401 A1* | 10/2015 | Miller ................ B01D 67/0037 210/500.25 |
| 2015/0309337 A1 | 10/2015 | Flitsch et al. |
| 2015/0321147 A1* | 11/2015 | Fleming ............... B01D 65/003 210/489 |
| 2015/0321149 A1 | 11/2015 | McGinnis |
| 2015/0323811 A1 | 11/2015 | Flitsch et al. |
| 2015/0336202 A1 | 11/2015 | Bedworth et al. |
| 2015/0342900 A1 | 12/2015 | Putnins |
| 2015/0346382 A1 | 12/2015 | Bliven et al. |
| 2015/0351887 A1 | 12/2015 | Peters |
| 2015/0359742 A1 | 12/2015 | Fassih et al. |
| 2015/0376448 A1 | 12/2015 | Urs |
| 2015/0378176 A1 | 12/2015 | Flitsch et al. |
| 2016/0009049 A1* | 1/2016 | Stoltenberg ............ B32B 9/045 428/137 |
| 2016/0038885 A1 | 2/2016 | Hogen-Esch et al. |
| 2016/0043384 A1 | 2/2016 | Zhamu et al. |
| 2016/0058932 A1* | 3/2016 | Stetson, Jr. .......... B01D 63/082 210/646 |
| 2016/0059190 A1 | 3/2016 | Yoo et al. |
| 2016/0067390 A1 | 3/2016 | Simon et al. |
| 2016/0074814 A1 | 3/2016 | Park et al. |
| 2016/0074815 A1* | 3/2016 | Sinton ................... B01D 69/02 95/49 |
| 2016/0084008 A1 | 3/2016 | Faircloth et al. |
| 2016/0084981 A1 | 3/2016 | Kayano et al. |
| 2016/0116237 A1 | 4/2016 | Alsadah et al. |
| 2016/0256805 A1* | 9/2016 | Grein ................ B01D 29/0093 |
| 2016/0272499 A1 | 9/2016 | Zurutuza Elorza et al. |
| 2016/0282326 A1 | 9/2016 | Waduge et al. |
| 2016/0284811 A1 | 9/2016 | Yu et al. |
| 2016/0339160 A1* | 11/2016 | Bedworth ............ A61M 1/1623 |
| 2017/0000937 A1 | 1/2017 | Gottschalk |
| 2017/0028640 A1 | 2/2017 | Harrison et al. |
| 2017/0032962 A1 | 2/2017 | Zurutuza Elorza et al. |
| 2017/0035943 A1 | 2/2017 | Simon et al. |
| 2017/0036916 A1* | 2/2017 | Bedworth ........... C01B 31/0484 |
| 2017/0037356 A1 | 2/2017 | Simon et al. |
| 2017/0057812 A1 | 3/2017 | Zurutuza Elorza et al. |
| 2017/0065939 A1 | 3/2017 | Kim et al. |
| 2017/0144107 A1 | 5/2017 | Garaj et al. |
| 2017/0202885 A1 | 7/2017 | Agulnick |
| 2017/0216923 A1 | 8/2017 | Babenko et al. |
| 2017/0217777 A1 | 8/2017 | Hong et al. |
| 2017/0239623 A1 | 8/2017 | Stoltenberg et al. |
| 2017/0296706 A1 | 10/2017 | Simon et al. |
| 2017/0296972 A1 | 10/2017 | Sinton et al. |
| 2017/0296976 A1* | 10/2017 | Liu ...................... B01D 65/108 |
| 2017/0296979 A1 | 10/2017 | Swett et al. |
| 2018/0147542 A1* | 5/2018 | Jhon ................. B01D 67/0062 |
| 2018/0207591 A1 | 7/2018 | Yu et al. |

FOREIGN PATENT DOCUMENTS

| | | |
|---|---|---|
| CN | 1128501 A | 8/1996 |
| CN | 101108194 A | 1/2008 |
| CN | 101243544 | 8/2008 |
| CN | 101428198 A | 5/2009 |
| CN | 101489653 A | 7/2009 |
| CN | 101996853 A | 3/2011 |
| CN | 102242062 A | 11/2011 |
| CN | 102344132 | 2/2012 |
| CN | 102423272 | 4/2012 |
| CN | 102592720 A | 7/2012 |
| CN | 101996853 B | 8/2012 |
| CN | 102637584 | 8/2012 |
| CN | 103153441 | 6/2013 |
| CN | 103182249 A | 7/2013 |
| CN | 203235358 | 10/2013 |
| CN | 103480281 | 1/2014 |
| CN | 103585891 | 2/2014 |
| CN | 103603706 A | 2/2014 |
| DE | 19536560 | 3/1997 |
| DE | 10 2005 049 388 A1 | 4/2007 |
| EP | 0 364 628 A1 | 4/1990 |
| EP | 1 034 251 | 1/2004 |
| EP | 1 777 250 A1 | 4/2007 |
| EP | 1 872 812 | 1/2008 |
| EP | 2 060 286 | 5/2009 |
| EP | 2 107 120 A1 | 10/2009 |
| EP | 2 230 511 A1 | 9/2010 |
| EP | 1 603 609 | 5/2011 |
| EP | 2 354 272 | 8/2011 |
| EP | 2 450 096 | 5/2012 |
| EP | 2 489 520 | 8/2012 |
| EP | 2 511 002 | 10/2012 |
| EP | 2 586 473 | 5/2013 |
| EP | 2 679 540 | 1/2014 |
| EP | 2 937 313 | 10/2015 |
| EP | 2 995 368 A1 | 3/2016 |
| EP | 3 070 053 | 9/2016 |
| EP | 3 084 398 | 10/2016 |
| EP | 1 538 2430.5 | 3/2017 |
| EP | 3 135 631 | 3/2017 |
| JP | 59-102111 | 7/1984 |
| JP | 10-510471 | 5/1995 |
| JP | 7504120 | 5/1995 |
| JP | 2001-232158 | 8/2001 |
| JP | 2002-126510 | 5/2002 |
| JP | 2004-179014 | 6/2004 |
| JP | 2005-126966 | 5/2005 |
| JP | 2006-188393 | 7/2006 |
| JP | 2006-262891 A | 10/2006 |
| JP | 2009-291777 | 12/2009 |
| JP | 2011-168448 A | 9/2011 |
| JP | 2011-241479 | 12/2011 |
| JP | 2012-500708 | 1/2012 |
| JP | 2004-202480 | 7/2014 |
| JP | 2015-503405 | 2/2015 |
| JP | 2016-175828 | 10/2016 |
| KR | 1020110084110 | 7/2011 |
| KR | 10-2012-0022164 A | 3/2012 |
| KR | 1020120022164 A | 3/2012 |

(56) References Cited

FOREIGN PATENT DOCUMENTS

| KR | 1020140002570 | | 1/2014 |
|---|---|---|---|
| WO | WO-93/33901 | | 3/1993 |
| WO | WO-93/12859 | | 8/1993 |
| WO | WO-95/00231 | | 1/1995 |
| WO | WO-97/12664 | A1 | 4/1997 |
| WO | WO-98/30501 | A2 | 7/1998 |
| WO | WO-00/70012 | | 11/2000 |
| WO | WO-02/055539 | A1 | 7/2002 |
| WO | WO-2013/115762 | | 8/2003 |
| WO | WO-2004/009840 | A1 | 1/2004 |
| WO | WO-2004/082733 | | 9/2004 |
| WO | WO-2005/047857 | A2 | 5/2005 |
| WO | WO-2007/103411 | A2 | 9/2007 |
| WO | WO-2007/140252 | A1 | 12/2007 |
| WO | WO-2008/008533 | | 1/2008 |
| WO | WO-2009/129984 | A1 | 10/2009 |
| WO | WO-2010/006080 | | 1/2010 |
| WO | WO-2010/115904 | A1 | 10/2010 |
| WO | WO-2011/019686 | A1 | 2/2011 |
| WO | WO-2011/046706 | A1 | 4/2011 |
| WO | WO-2011/001674 | | 6/2011 |
| WO | WO-2011/063458 | A2 | 6/2011 |
| WO | WO-2011/075158 | | 6/2011 |
| WO | WO-2011/094204 | A2 | 8/2011 |
| WO | WO-2011/100458 | A2 | 8/2011 |
| WO | WO-2011/138689 | A2 | 11/2011 |
| WO | WO-2012/006657 | A1 | 1/2012 |
| WO | WO-2012/021801 | A2 | 2/2012 |
| WO | WO-2012/027148 | A1 | 3/2012 |
| WO | WO-2012/028695 | | 3/2012 |
| WO | WO-2012/030368 | A1 | 3/2012 |
| WO | WO-2012/073998 | A1 | 6/2012 |
| WO | WO-2012/125770 | | 9/2012 |
| WO | WO 2012/138671 | | 10/2012 |
| WO | WO-2012/142852 | A1 | 10/2012 |
| WO | WO-2013/016445 | A1 | 1/2013 |
| WO | WO 2013/048063 | | 4/2013 |
| WO | WO-2013/138137 | A1 | 9/2013 |
| WO | WO-2013/138698 | A1 | 9/2013 |
| WO | WO-2013/142133 | | 9/2013 |
| WO | WO-2013/142539 | | 9/2013 |
| WO | WO-2013/151799 | | 10/2013 |
| WO | WO-2013/152179 | A1 | 10/2013 |
| WO | WO-2014/038600 | A1 | 3/2014 |
| WO | WO-2014/084856 | | 6/2014 |
| WO | WO-2014/084861 | A1 | 6/2014 |
| WO | WO-2014/159043 | | 10/2014 |
| WO | WO-2014/168629 | A1 | 10/2014 |
| WO | WO-2014/204722 | A1 | 12/2014 |
| WO | PCT/US2015/018114 | | 2/2015 |
| WO | WO-2015/030698 | A1 | 3/2015 |
| WO | PCT/US2015/028948 | | 5/2015 |
| WO | WO-2015/110277 | | 7/2015 |
| WO | WO-2015/116857 | | 8/2015 |
| WO | WO-2015/116946 | | 8/2015 |
| WO | WO-2015/138736 | A1 | 9/2015 |
| WO | WO-2015/138752 | A1 | 9/2015 |
| WO | WO-2015/1138771 | A1 | 9/2015 |
| WO | WO-2015/197217 | | 12/2015 |
| WO | WO-2016/036888 | A1 | 3/2016 |
| WO | WO-2016/102003 | | 6/2016 |

OTHER PUBLICATIONS

U.S. Appl. No. 14/856,471, filed Sep. 16, 2015.
U.S. Appl. No. 15/099,295, filed Apr. 14, 2016.
U.S. Appl. No. 15/099,410, filed Apr. 14, 2016.
U.S. Appl. No. 15/099,420, filed Apr. 14, 2016.
U.S. Appl. No. 15/099,289, filed Apr. 14, 2016.
U.S. Appl. No. 15/099,447, filed Apr. 14, 2016.
U.S. Appl. No. 15/099,269, filed Apr. 14, 2016.
U.S. Appl. No. 15/099,239, filed Apr. 14, 2016.
U.S. Appl. No. 15/099,464, filed Apr. 14, 2016.
U.S. Appl. No. 15/099,276, filed Apr. 14, 2016.
U.S. Appl. No. 15/099,482, filed Apr. 14, 2016.
U.S. Appl. No. 15/099,056, filed Apr. 14, 2016.
U.S. Appl. No. 15/099,099, filed Apr. 14, 2016.
U.S. Appl. No. 14/656,190, filed Mar. 12, 2015.
U.S. Appl. No. 15/099,304, filed Apr. 14, 2016.
U.S. Appl. No. 15/099,588, filed Apr. 14, 2016.
U.S. Appl. No. 14/707,808, filed May 8, 2015.
U.S. Appl. No. 14/819,273, filed Aug. 5, 2015.
U.S. Appl. No. 14/856,198, filed Sep. 16, 2015.
U.S. Appl. No. 14/754,531, filed Jun. 29, 2015.
U.S. Appl. No. 14/610,770, filed Jan. 30, 2015.
U.S. Appl. No. 14/656,657, filed Mar. 12, 2015.
U.S. Appl. No. 14/609,325, filed Jan. 29, 2015.
U.S. Appl. No. 14/656,580, filed Mar. 12, 2015.
U.S. Appl. No. 13/480,569, filed May 25, 2012.
U.S. Appl. No. 14/843,944, filed Sep. 2, 2015.
U.S. Appl. No. 15/099,193, filed Apr. 14, 2016.
Notice of Allowance for U.S. Appl. No. 14/819,273 dated Oct. 28, 2016.
U.S. Office Action for U.S. Appl. No. 14/193,007 dated Oct. 21, 2016.
U.S. Office Action for U.S. Appl. No. 14/193,007 dated Dec. 21, 2015.
U.S. Office Action for U.S. Appl. No. 14/193,007 dated Jul. 1, 2016.
International Search Report and Written Opinion corresponding to International Application No. PCT/US15/13599 dated Jul. 20, 2015.
Barreiro et al. "Understanding the catalyst-free transformation of amorphous carbon into graphene by current-induced annealing," Scientific Reports, 3 (Article 1115): 1-6 (Jan. 2013).
Botari et al., "Graphene healing mechanisms: A theoretical investigation," Carbon, 99: 302-309 (Apr. 2016) (published online Dec. 2015).
Chen et al., "Defect Scattering in Graphene," Physical Review Letters, 102: 236805-1-236805-4 (Jun. 2009).
Chen et al., "Self-healing of defected graphene," Applied Physics Letters, 102(10): 103107-1-103107-5 (Mar. 2013).
Cheng et al., "Ion Transport in Complex Layered Graphene-Based Membranes with Tuneable Interlayer Spacing," Science Advances, 2(2): e1501272 (9 pages) (Feb. 2016).
Crock et al., "Polymer Nanocomposites with Graphene-Based Hierarchical Fillers as Materials for Multifunctional Water Treatment Membranes," Water Research, 47(12): 3984-3996 (Aug. 2013) (published online Mar. 2013).
Han et al., "Ultrathin Graphene Nanofiltration Membrane for Water Purification," Advanced Functional Materials, 23(29): 3693-3700 (Aug. 2013).
International Search Report and Written Opinion in PCT/US2016/027583 dated Jan. 13, 2017.
Written Opinion in PCT/US2016/027590 dated Jan. 6, 2017.
International Search Report and Written Opinion in PCT/US2016/027594 dated Jan. 13, 2017.
International Search Report and Written Opinion in PCT/US2016/027628 dated Jan. 9, 2017.
International Search Report and Written Opinion in PCT/US2016/027631 dated Jan. 13, 2017.
International Search Report and Written Opinion in PCT/US2016/027632 dated Jan. 9, 2017.
Written Opinion in PCT/US2016/052010 dated Dec. 20, 2016.
International Search Report in PCT/US2016/027629 dated Dec. 8, 2016.
International Search Report in PCT/US2016/052007 dated Dec. 27, 2016.
Kjeldsen, T., "Yeast secretory expression of insulin precursors," Appl Microbiol Biotechnol, 54: 277-286 (May 2000).
Lin et al., "A Direct and Polymer-Free Method for Transferring Graphene Grown by Chemical Vapor Deposition to Any Substrate," ACSNANO, 8(2): 1784-1791 (Jan. 2014).
Liu et al. "Synthesis of high-quality monolayer and bilayer graphene on copper using chemical vapor deposition," Carbon, 49(13): 4122-4130 (Nov. 2011) (published online May 2011).
O'Hern et al., "Nanofiltration across defect-sealed nanoporous monolayer graphene," Nano Letters, 15(5): 3254-3260 (Apr. 2015).

(56) References Cited

OTHER PUBLICATIONS

U.S. Corrected Notice of Allowance in U.S. Appl. No. 13/480,569 dated May 26, 2015.
U.S. Notice of Allowance for U.S. Appl. No. 14/610,770 dated Apr. 25, 2016.
U.S. Notice of Allowance in U.S. Appl. No. 14/819,273 dated Dec. 14, 2016.
U.S. Notice of Allowance in U.S. Appl. No. 13/480,569 dated Feb. 27, 2015.
U.S. Office Action in U.S. Appl. No. 13/480,569 dated Jul. 30, 2014.
U.S. Office Action in U.S. Appl. No. 14/856,471 dated Dec. 1, 2016.
U.S. Restriction Requirement in U.S. Appl. No. 14/193,007 dated Jul. 17, 2015.
Wang et al., "Graphene Oxide Membranes with Tunable Permeability due to Embedded Carbon Dots," Chemical Communications, 50(86): 13089-13092 (Nov. 2014) (published online Sep. 2014).
Xu et al., "Graphene Oxide-$TiO_2$ Composite Filtration Membranes and their Potential Application for Water Purification," Carbon, 62: 465-471 (Oct. 2013) (published online Jun. 2013).
Zhao et al., "A glucose-responsive controlled release of insulin system based on enzyme multilayers-coated mesoporous silica particles," Chem. Commun., 47: 9459-9461 (Jun. 2011).
AE Search and Examination Report for United Arab Emirates Application No. P186/13 dated Oct. 4, 2016.
Agenor et al., "Renal tubular dysfunction in human visceral leishmaniasis (Kala-azar)," Clinical Nephrology 71(5): 492-500 (May 2009) (available online Mar. 21, 2011).
Albert et al., "Ringer's lactate is compatible with the rapid infusion of AS-3 preserved packed red blood cells," Can. J. Anaesth. 56(5): 352-356 (May 2009) (available online Apr. 2, 2009).
Aluru et al. "Modeling electronics on the nanoscale." Handbook of nanoscience, engineering and technology Goddard W, Brenner D, Lyshevski S, Iafrate GJ (2002): 11-1.
Alvarenga, "Carbon nanotube materials for aerospace wiring" Rochester Institute of Technology, 2010.
AMI Applied Membranes Inc., "Filmtec Nanofiltration Membrane Elements", Retrieved from appliedmembranes.com/nanofiltration_elements.htm, accessed Apr. 28, 2015 (2 Pages).
Aso et al., "Comparison of serum high-molecular weight (HMW) adiponectin with total adiponectin concentrations in type 2 diabetic patients with coronary artery using a novel enzyme-linked immunosorbent assay to detect HMW adiponectin," Diabetes 55(7): 1954-1960 (Jul. 2006).
AU Examination Report for Australian Patent Application No. 2013235234, dated Jan. 13, 2017, 4 pages.
AU Examination Report for Australian Patent Application No. 2013363283, dated Jun. 20, 2017, 4 pages.
AU Notice of Acceptance for Australian Application No. 2011293742 dated Jan. 13, 2016.
Axelsson et al., "Acute hyperglycemia induces rapid, reversible increases in glomerular permeability in nondiabetic rats," Am. J. Physiol. Renal Physiol. 298(6): F1306-F1312 (Jun. 2010) (available online Mar. 17, 2010).
Bains et al., "Novel lectins from rhizomes of two Acorus species with mitogenic activity and inhibitory potential towards murine cancer cell lines," Int'l Immunopharmacol. 5(9): 1470-1478 (Aug. 2005) (available online May 12, 2005).
Baker, "Membrane Technology and Applications", Membrane Technology and Applications; Apr. 14, 2004; pp. 92-94.
Barreiro et al. "Transport properties of graphene in the high-current limit." Physical review letters 103.7 (2009): 076601.
Bazargani et al. "Low molecular weight heparin improves peritoneal ultrafiltration and blocks complement and coagulation," Peritoneal Dialysis Int'l 25(4): 394-404 (Jul. 2005-Aug. 2005).
Bazargani, "Acute inflammation in peritoneal dialysis: experimental studies in rats. Characterization of regulatory mechanisms," Swedish Dental J. Supp. 171: 1-57, i (2005).
Beppu et al., "Antidiabetic effects of dietary administration of Aloe arborescens Miller components on multiple low-dose streptozotocin-induced diabetes in mice: investigation on hypoglycemic action and systemic absorption dynamics of aloe components," J. Ethnopharmacol. 103(3): 468-77 (Feb. 20, 2006) (available online Jan. 6, 2006).
Bieri et al. "Two-dimensional Polymer Formation on Surfaces: Insight into the Roles of Precursor Mobility and Reactivity" JACS, 2010, vol. 132, pp. 16669-16676.
Bruin et al., "Maturation and function of human embryonic stem cell-derived pancreatic progenitors in macroencapsulation devices following transplant into mice", Diabetologia (2013), vol. 56: 1987-1998 (Jun. 16, 2013).
Chu Ju, et al. "Modern Biotechnology" East China University of Technology Press, (Sep. 2007), vol. 1; pp. 306-307, ISBN 978-7-5628-2116-8.
Clochard, "Track-Etched Polymer Membranes," Laboratory of Irradiated Solids, Ecole Polytechnique, retrieved from http://www.lsi.polytechnique.fr/home/research/physics-and-chemistry-of-nano-objects/trac . . . , Accessed Jul. 30, 2015 (2 pages).
CN Notification of Grant for Chinese Application No. 201180049184.5 dated Jun. 6, 2016.
CN Office Action for Chinese Application No. 201380014845.X dated Jul. 8, 2016.
CN Office Action for Chinese Application No. 201380014845.X dated Sep. 2, 2015.
CN Office Action for Chinese Application No. 201380019165.5 dated Aug. 25, 2015.
CN Office Action for Chinese Application No. 201380073141.X dated Jun. 8, 2016.
CN Office Action for Chinese Application No. 201380073141.X dated Mar. 21, 2017.
CN Office Action for Chinese Application No. 201480015372.X dated Aug. 2, 2016.
CN Office Action for Chinese Application No. 20118004918.5 dated Jun. 15, 2015.
CN Office Action for Chinese Application No. 201180049184.5 dated Jul. 30, 2014.
CN Office Action for Chinese Application No. 201180049184.5 dated Mar. 4, 2016.
CN Office Action for Chinese Application No. 201380014845.X dated Dec. 23, 2016.
CN Office Action for Chinese Application No. 201380017644.5 dated Feb. 7, 2017.
CN Office Action for Chinese Application No. 201380017644.5 dated May 26, 2016.
CN Office Action for Chinese Application No. 201380017644.5 dated Sep. 29, 2015.
CN Office Action in Chinese Application No. 201380013988.9 dated Oct. 27, 2015.
Daniel et al. "Implantable Diagnostic Device for Cancer Monitoring." Biosens Bioelectricon. 24(11): 3252-3257 (Jul. 15, 2009).
Database WPI, Week 201238, Thomson Scientific, London, GB; AN 2012-D49442.
De Lannoy et al., "Aquatic Biofouling Prevention by Electrically Charged Nanocomposite Polymer Thin Film Membranes", 2013 American Water Work Association membrane Technology Conference; Environmental science & technology 47.6 (2013): 2760-2768.
Deng et al., "Renal protection in chronic kidney disease: hypoxia-inducible factor activation vs. angiotensin II blockade," Am. J. Physiol. Renal Physiol. 299(6): F1365-F1373 (Dec. 2010) (available online Sep. 29, 2010).
Edwards, "Large Sheets of Graphene Film Produced for Transparent Electrodes (w/ Video)"; (Jun. 21, 2010), PhysOrg.com, retrieved on May 15, 2017 from https://phys.org/news/2010-06-large-sheets-graphene-transparentelectrodes.html (2 pages).
EP Office Action for European Application No. 13715529.7 dated Jun. 24, 2016.
Fayerman, "Canadian scientists use stem cells to reverse diabetes in mice", The Telegraph-Journal (New Brunswick), 1-2 (Jun. 29, 2012).
Fayerman, "Diabetes reversed in mice; University of B.C. scientists use embryonic stem cells to deal with Type 1 disease", The Vancouver Sun (British Columbia), 1-2 (Jun. 28, 2012).
Fejes et al. "A review of the properties and CVD synthesis of coiled carbon nanotubes." Materials 3.4 (2010): 2618-2642.

(56) References Cited

OTHER PUBLICATIONS

Franzen, C. "MIT Setting Up Industrial-Scale Graphene Printing Press" Sep. 23, 2011, retrieved from http://talkingpointsmemo.com/idealab/mit-setting-up-industrial-scale-graphene-printing-press (2 pages).
Freedman et al., "Genetic basis of nondiabetic end-stage renal disease," Semin. Nephrol. 30(2): 101-110 (Mar. 2010).
Garcia-Lopez et al., "Determination of high and low molecular weight molecules of icodextrin in plasma and dialysate, using gel filtration chromatography, in peritoneal dialysis patients," Peritoneal Dialysis Int'l 25(2): 181-191 (Mar. 2005-Apr. 2005).
Georgakilas et al., "Functionalization of Graphene: Covalent and Non-Covalent Approaches, Derivatives and Applications," Chem. Rev., (2012) 112(11), pp. 6156-6214.
Gnudi "Molecular mechanisms of proteinuria in diabetes," Biochem. Soc. Trans. 36(5): 946-949 (Oct. 2008).
Gotloib et al., "Peritoneal dialysis in refractory end-stage congestive heart failure: a challenge facing a no-win situation," Nephrol. Dialysis. Transplant. 20(Supp. 7): vii32-vii36 (Jul. 2005).
Harvey "Carbon as conductor: a pragmatic view." Proceedings of the 61st IWCS Conference, http://www.iwcs.org/archives/56333-iwcs-2012b-1.1584632. vol. 1. 2012.
Hashimoto et al. "Direct evidence for atomic defects in graphene layers." Nature 430.7002 (2004): 870-873.
He, et al. "The attachment of Fe3 O4 nanoparticles to graphene oxide by covalent bonding." Carbon 48.11 (2010): 3139-3144.
Hone et al. "Graphene has record-breaking strength" Physicsworld.com, Jul. 17, 2008.
Huang et al., "Gene expression profile in circulating mononuclear cells afterexposure to ultrafine carbon particles," Inhalation Toxicol. 22(10): 835-846 (Aug. 2010).
Humplik, et al. "Nanostructured materials for water desalination." Nanotechnology 22.29 (2011): 292001.
International Search Report and Written Opinion dated Jan. 5, 2012 for related International Application No. PCT/US11/47800.
International Search Report and Written Opinion dated Jul. 5, 2017 from related PCT application PCT/US2017/024147.
International Search Report and Written Opinion dated Mar. 12, 2014 for International Application No. PCT/US2013/074942.
International Search Report and Written Opinion for International Application No. PCT/US2011/047800 dated Jan. 5, 2012.
International Search Report and Written Opinion for PCT Application No. PCT/US2014/023027 dated Jun. 26, 2014.
International Search Report and Written Opinion in International Application No. PCT/US2013/030344 dated Jun. 19, 2013.
International Search Report and Written Opinion in International Application No. PCT/US2013/033035 dated Jun. 28, 2013.
International Search Report and Written Opinion in International Application No. PCT/US2013/033400, dated Jun. 28, 2013.
International Search Report and Written Opinion in International Application No. PCT/US2013/033403 dated Jun. 28, 2013.
International Search Report and Written Opinion in PCT/US2014/041766, dated Sep. 30, 2014.
International Search Report and Written Opinion dated Jun. 5, 2014 in International Application No. PCT/US2014/021677.
International Search Report and Written Opinion dated Jun. 6, 2014 in International Application No. PCT/US2014/023043.
International Search Report and Written Opinion dated Dec. 16, 2014, for International Application No. PCT/US2014/051011.
International Search Report and Written Opinion dated Jun. 19, 2015, in International Application No. PCT/US2015/020287.
Inui et al. "Molecular dynamics simulations of nanopore processing in a graphene sheet by using gas cluster ion beam." Applied Physics A: Materials Science & Processing 98.4 (2010): 787-794.
Israelachvili, "Intermolecular and Surface Forces," 3rd ed., Chap. 7.1, Sizes of Atoms, Molecules, and Ions, 2011, 1 page.
Jiao et al., "Castration differentially alters basal and leucine-stimulated tissue protein synthesis in skeletal muscle and adipose tissue," Am. J. Physiol. Endocrinol. Metab. 297(5): E1222-1232 (Nov. 2009) (available online Sep. 15, 2009).

JP Office Action in Japanese Application No. 2015-501729 dated Dec. 9, 2016 (English translation).
JP Office Action in Japanese Application No. 2015-501729 dated Jun. 20, 2017 (English translation).
JP Office Action in Japanese Application No. 2015-501867 dated Oct. 11, 2016 (English translation).
JP Office Action in Japanese Application No. 2015-503405 dated Nov. 14, 2016 (English translation).
JP Office Action in Japanese Application No. 2015-503406 dated Dec. 6, 2016(English translation).
Kang et al., "Effect of eplerenone, enalapril and their combination treatment on diabetic nephropathy in type II diabetic rats," Nephrol. Dialysis Transplant. 24(1): 73-84 (Jan. 2009).
Kang et al., "Efficient Transfer of Large-Area Graphene Films onto Rigid Substrates by Hot Pressing," American Chemical Society Nano, 6(6): 5360-5365(May 28, 2012).
Kar et al., "Effect of glycation of hemoglobin on its interaction with trifluoperazine," Protein J. 25(3): 202-211 (Apr. 2006) (available online Jun. 6, 2006).
Kawamoto et al., "Serum high molecular weight adiponectin is associated with mild renal dysfunction in Japanese adults," J. Atherosclerosis Thrombosis 17(11): 1141-1148 (Nov. 27, 2011).
Khun et al. "From Microporous Regular Frameworks to Mesoporous Materials with Ultrahigh Surface Area: Dynamic reorganization of Porous Polvmer Networks" JACS, 2008; vol. 130; pp. 13333-13337.
Krupka et al., "Measurements of the Sheet Resistance and Conductivity of Thin Epitaxial Graphene and SiC Films" Applied Physics Letters 96, 082101-I; Feb. 23, 2010.
Kumar et al., "Modulation of alpha-crystallin chaperone activity in diabetic rat lens by curcumin," Molecular Vision 11: 561-568 (Jul. 26, 2005).
Lathuiliere et al., "Encapsulated Cellular Implants for Recombinant Protein Delivery and Therapeutic Modulation of the Immune System," Journal of Applied Physics, Int. J. Mol. Sci., 16: 10578-10600 (May 8, 2015).
Lee, et al. "Measurement of the elastic properties and intrinsic strength of monolayer graphene." science 321.5887 (2008): 385-388.
Lucchese et al. "Quantifying ion-induced defects and Raman relaxation length in graphene." Carbon 48.5 (2010): 1592-1597.
MacLeod et al. "Supramolecular Orderinng in Oligothiophene-Fullerene Monolayers" JACS, 2009, vol. 131, pp. 16844-16850.
Mattevi et al. "A review of chemical vapour deposition of graphene on copper." Journal of Materials Chemistry 21.10 (2011): 3324-3334.
Miao et al. "Chemical vapor deposition of grapheme" INTECH Open Access Publisher, 2011.
MIT/MTL Center for Graphene Devices and 2D Systems, retrieved from: http://www-mtl.mit.edu/wpmu/graphene/ [retrieved from Aug. 21, 2014 archive] (3 pages).
MIT/MTL Center for Graphene Devices and 2D Systems, retrieved from: http://www-mtl.mit.edu/wpmu/graphene/ [retrieved from Mar. 4, 2015 archive] (3 pages).
Nafea, et al. "Immunoisolating semi-permeable membranes for cell encapsulation: focus on hydrogels." J Control Release. 154(2): 110-122 (Sep. 5, 2011).
Nezlin, "Circulating non-immune IgG complexes in health and disease," Immunol. Lett. 122(2); 141-144 (Feb. 21, 2009) (available online Feb. 2, 2009).
Norata et al., "Plasma adiponectin levels in chronic kidney disease patients: relation with molecular inflammatory profile and metabolic status," Nutr. Metab. Cardiovasc. Dis. 20(1): 56-63 (Jan. 2010) (available online Apr. 9, 2009).
Ogawa et al., "Exosome-like vesicles in Gloydius blomhoffii blomhoffii venom," Toxicon 51(6): 984-993 (May 2008) (available online Feb. 19, 2008).
Ohgawara et al. "Assessment of pore size of semipermeable membrane for immunoisolation on xenoimplatntation of pancreatic B cells using a diffusion chamber." Transplant Proc. (6): 3319-3320. 1995.

(56) References Cited

OTHER PUBLICATIONS

Oki et al., "Combined acromegaly and subclinical Cushing disease related to high-molecular-weight adrenocorticotropic hormone," J. Neurosurg. 110(2): 369-73 (Feb. 2009).
Osorio et al., "Effect of treatment with losartan on salt sensitivity and SGLT2 expression in hypertensive diabetic rats," Diabetes Res. Clin. Pract. 86(3): e46-e49 (Dec. 2009) (available online Oct. 2, 2009).
Osorio et al., "Effect of phlorizin on SGLT2 expression in the kidney of diabetic rats," J. Nephrol. 23(5): 541-546 (Sep.-Oct. 2010).
Padidela et al., "Elevated basal and post-feed glucagon-like peptide 1 (GLP-1) concentrations in the neonatal period," Eur. J. Endocrinol. 160(1): 53-58 (Jan. 2009) (available online Oct. 24, 2008).
Pall Corporation, "Pall Water Processing Disc-Tube Filter Technology", Retrieved on Feb. 10, 2015, Retrieved from http://www.pall.com /pdfs/Fuels-and-Chemicals/Disc-Tube_Filter_Technoloqy-DT100b.pdF (15 Pages).
Plant et al. "Size-dependent propagation of Au nanoclusters through few-layer grapheme," The Royal Society of Chemistry 2013, Nanoscale.
Pollard, "Growing Graphene via Chemical Vapor" Department of Physics, Pomona College; May 2, 2011.
Rafael et al. "Cell Transplantation and Immunoisolation: Studies on a macroencapsultaion device." From the Departments of Transplantation Pathology: Stockholm, Sweden (1999).
Rezania et al., "Enrichment of Human Embryonic Stem Cell-Derived NKX6.1-Expressing Pancreatic Progenitor Cells Accelerates the Maturation of Insulin-Secreting Cells In Vivo", Stem Cells Regenerative Medicine, vol. 31: 2432-2442 (Jul. 29, 2013).
Rezania et al., "Maturation of Human Embryonic Stem Cell-Derived Pancreatic Progenitors Into Functional Islets Capable of Treating Pre-existing Diabetes in Mice", Diabetes Journal, vol. 61: 2016-2029 (Aug. 1, 2012).
Ribeiro et al., "Binary Mutual Diffusion Coefficients of Aqueous Solutions of Sucrose, Lactose, Glucose, and Fructose in the Temperature Range from (298.15 to 328.15) K," J. Chem. Eng. Data 51(5): 1836-1840 (Sep. 2006) (available online Jul. 20, 2006).
Rippe et al., "Size and charge selectivity of the glomerular filter in early experimental diabetes in rats," Am. J. Physiol. Renal Physiol. 293(5): F1533-F1538 (Nov. 2007)(available online Aug. 15, 2007).
SA Final Rejection for Saudi Arabia Application No. 113340400 dated Jan. 28, 2016.
SA First Examination Report for Saudi Arabia Application No. 113340401 dated Apr. 28, 2015.
SA First Examination Report for Saudi Arabia Application No. 113340424 dated May 10, 2015.
SA First Examination Report for Saudi Arabia Application No. 113340426 dated May 12, 2015.
SA First Examination Report in Saudi Arabia Application No. 113340400 dated Apr. 13, 2015.
SA Second Examination Report for Saudi Arabia Application No. 113340400 dated Aug. 11, 2015.
Sanchez, et al. "Biological Interactions of Graphene-Family Nanomaterials—An Interdisciplinary Review." Chem Res Toxicol. 25(1): 15-34 (Jan. 13, 2012).
Sethna et al., "Serum adiponectin levels and ambulatory blood pressure monitoring in pediatric renal transplant recipients," Transplantation 88(8): 1030-1037 (Oct. 27, 2009).
Sullivan et al., "Microarray analysis reveals novel gene expression changes associated with erectile dysfunction in diabetic rats," Physiol. Genom. 23(2): 192-205 (Oct. 17, 2005) (available online Aug. 23, 2005).
Swett et al, "Imagining and Sculpting Graphene on the atomic scale" Oak Ridge National Laboratory's (ORNL) Center for Nanophase Materials Sciences (CNMS) Biannual Review. 1 page.
Swett et al, "Supersonic Nanoparticle Interaction with Suspended CVD Graphene", Microsc. Microanal. 22 (Suppl 3): 1670-1671 (Jul. 25, 2016).
Takata et al., "Hyperresistinemia is associated with coexistence of hypertension and type 2 diabetes," Hypertension 51. 2 (Feb. 2008): 534-9.
Tamborlane et al., "Continuous Glucose Monitoring and Intensive Treatment of Type 1 Diabetes" N Engl J Med 359;14: 1464-1476 (Oct. 2, 2008).
Tanugi et al., "Nanoporous Graphene Could Outperform Best Commercial Water Desalination Techniques,"; ACS 2012; Jun. 25, 2012; Weftec 2012; Sep. 29-Oct. 3.
Totani et al. "Gluten binds cytotoxic compounds generated in heated frying oil." Journal of oleo science 57.12 (2008): 683-690.
Tsukamoto et al. "Purification, characterization and biological activities of a garlic oliqosaccharide," Journal of UOEH 30. 2 (Jun. 1, 2008): 147-57.
TW Office Action in Taiwanese Application No. 102146079 dated Apr. 14, 2017. 9 Pages.(English translation).
TW Search Report in Taiwanese Application No. 102146079 dated Apr. 14, 2017. 1 page.
UMEA Universitet "Graphene nanoscrolls are formed by decoration of magnetic nanoparticles." ScienceDaily. Aug. 15, 2013. https://www.sciencedaily.com/releases/2013/08/130815084402.htm (3 pages).
U.S. Notice of Allowance for U.S. Appl. No. 12/868,150 dated Sep. 25, 2012.
U.S. Notice of Allowance for U.S. Appl. No. 13/548,539 dated Aug. 18, 2015.
U.S. Notice of Allowance for U.S. Appl. No. 13/548,539 dated Jul. 23, 2015.
U.S. Notice of Allowance for U.S. Appl. No. 13/719,579 dated May 20, 2016.
U.S. Notice of Allowance for U.S. Appl. No. 13/795,276 dated Oct. 7, 2016.
U.S. Notice of Allowance for U.S. Appl. No. 13/802,896 dated Apr. 1, 2015.
U.S. Notice of Allowance for U.S. Appl. No. 13/803,958 dated Aug. 29, 2016.
U.S. Notice of Allowance for U.S. Appl. No. 13/803,958 dated Jun. 2, 2016.
U.S. Notice of Allowance for U.S. Appl. No. 13/803,958 dated Sep. 12, 2016.
U.S. Notice of Allowance for U.S. Appl. No. 13/804,085 dated Jan. 15, 2015.
U.S. Notice of Allowance for U.S. Appl. No. 13/804,085 dated Mar. 12, 2015.
U.S. Notice of Allowance for U.S. Appl. No. 13/923,503 dated Oct. 14, 2016.
U.S. Notice of Allowance for U.S. Appl. No. 13/923,503 dated Oct. 5, 2016.
U.S. Notice of Allowance for U.S. Appl. No. 14/200,195 dated Jul. 5, 2016.
U.S. Notice of Allowance for U.S. Appl. No. 14/200,530 dated Aug. 1, 2016.
U.S. Notice of Allowance for U.S. Appl. No. 14/203,655 dated Dec. 9, 2016.
U.S. Notice of Allowance in U.S. Appl. No. 12/868,150 dated Sep. 25, 2012.
U.S. Notice of Allowance in U.S. Appl. No. 13/795,276 dated Jan. 19, 2017.
U.S. Notice of Allowance in U.S. Appl. No. 13/803,958 dated Aug. 29, 2016.
U.S. Notice of Allowance in U.S. Appl. No. 13/803,958 dated Sep. 12, 2016.
U.S. Notice of Allowance in U.S. Appl. No. 14/610,770 dated May 5, 2017.
U.S. Notice of Allowance in U.S. Appl. No. 14/656,580 dated May 8, 2017.
U.S. Notice of Allowance in U.S. Appl. No. 14/819,273 dated Jun. 9, 2017.
U.S. Notice of Allowance in U.S. Appl. No. 15/099,464 dated Jun. 16, 2017.
U.S. Office Action for U.S. Appl. No. 13/548,539 dated Feb. 6, 2015.
U.S. Office Action for U.S. Appl. No. 13/719,579 dated Jul. 8, 2015.

(56) References Cited

OTHER PUBLICATIONS

U.S. Office Action for U.S. Appl. No. 13/719,579 dated May 4, 2016.
U.S. Office Action for U.S. Appl. No. 13/795,276 dated Apr. 22, 2016.
U.S. Office Action for U.S. Appl. No. 13/795,276 dated Oct. 6, 2015.
U.S. Office Action for U.S. Appl. No. 13/802,896 dated Sep. 24, 2014.
U.S. Office Action for U.S. Appl. No. 13/803,958 dated Aug. 11, 2014.
U.S. Office Action for U.S. Appl. No. 13/803,958 dated May 28, 2015.
U.S. Office Action for U.S. Appl. No. 13/803,958 dated Nov. 18, 2015.
U.S. Office Action for U.S. Appl. No. 13/923,503 dated Mar. 22, 2016.
U.S. Office Action for U.S. Appl. No. 14/031,300 dated Jan. 20, 2016.
U.S. Office Action for U.S. Appl. No. 14/031,300 dated Jul. 7, 2015.
U.S. Office Action for U.S. Appl. No. 14/200,195 dated Mar. 21, 2016.
U.S. Office Action for U.S. Appl. No. 14/200,195 dated Nov. 4, 2015.
U.S. Office Action for U.S. Appl. No. 14/200,530 dated Feb. 29, 2016.
U.S. Office Action for U.S. Appl. No. 14/203,655 dated Aug. 10, 2016.
U.S. Office Action for U.S. Appl. No. 14/656,190 dated May 18, 2017.
U.S. Office Action for U.S. Appl. No. 14/656,657 dated Jul. 7, 2017.
U.S. Office Action for U.S. Appl. No. 14/686,452 dated Jun. 9, 2017.
U.S. Office Action for U.S. Appl. No. 14/843,944 dated Jun. 23, 2017.
U.S. Office Action for U.S. Appl. No. 14/856,471 dated May 31, 2017.
U.S. Office Action for U.S. Appl. No. 14/858,741 dated Dec. 1, 2016.
U.S. Office Action for U.S. Appl. No. 15/289,944 dated Feb. 9, 2017.
U.S. Office Action for U.S. Appl. No. 15/336,545 dated Dec. 19, 2016.
U.S. Office Action for U.S. Appl. No. 15/453,441 dated Jun. 5, 2017.
U.S. Office Action in U.S. Appl. No. 14/193,007 dated Apr. 24, 2017.
U.S. Office Action in U.S. Appl. No. 14/656,617 dated Apr. 4, 2017.
U.S. Office Action on U.S. Appl. No. 14/656,335 dated Apr. 25, 2017.
U.S. Office Action on U.S. Appl. No. 15/332,982 dated Jan. 30, 2017.
U.S. Supplemental Notice of Allowance for U.S. Appl. No. 13/795,276 dated Nov. 29, 2016.
Vallon,"Micropuncturing the nephron," Pflugers Archiv : European journal of physiology 458. 1 (May 2009): 189-201.
Van Der Zande et al. "Large-scale arrays of single-layer graphene resonators." Nano letters 10.12 (2010): 4869-4873.
Verdonck, P., "Plasma Etching", in Oficina de Microfabricao: Projeto e Construcao de CI's MOS, Swart, J.W., Ed., Campinas (Sao Paulo, Brazil): UNICAMP, 2006, ch. 10, p. 9.
Vlassiouk et al. "Large scale atmospheric pressure chemical vapor deposition of graphene." Carbon 54 (2013): 58-67.
Vriens et al. "Methodological considerations in quantification of oncological FDG PET studies." European journal of nuclear medicine and molecular imaging 37.7 (2010): 1408-1425.
Wang et al. "Direct Observation of a Long-Lived Single-Atom Catalyst Chiseling Atomic Structures in Graphene," Nano Lett., 2014, pp. A-F.

Wang et al., "Porous Nanocarbons: Molecular Filtration and Electronics," Advances in Graphene Science, Edited by Mahmood Aliofkhazraei, (2013) ISBN 978-953-51-1182-5, Publisher: InTech; Chapter 6, pp. 119-160.
Wang et al.,"What is the role of the second "structural" NADP+-binding site in human glucose 6-phosphate dehydrogenase?," Protein science a publication of the Protein Society 17. 8 (Aug. 2008): 1403-11.
Wei et al., "Synthesis of N-doped graphene by chemical vapor deposition and its electrical properties", Nano Lett. 2009 9 1752-58.
Xiaogan Liang et al., Formation of Bandgap and Subbands in Graphene Nanomeshes with Sub-10nm Ribbon Width Fabricated via Nanoimprint Lithography., Nano Letters, Jun. 11, 2010, pp. 2454-2460.
Xie et al., "Fractionation and characterization of biologically-active polysaccharides from Artemisia tripartite," Phytochemistry 69. 6 (Apr. 2008): 1359-71.
Xie, et al. "Controlled fabrication of high-quality carbon nanoscrolls from monolayer graphene." Nano letters 9.7 (2009): 2565-2570.
Yagil et al. "Nonproteinuric diabetes-associated nephropathy in the Cohen rat model of type 2 diabetes" Diabetes 54. 5 (May 2005): 1487-96.
Zan et al. "Interaction of Metals with Suspended Graphene Observed by Transmission Electron Microscopy", J. Phys. Chem. Lett., Mar. 8, 2012, 3, 953-958.
Zhang et al. "Effect of Chemical Oxidation on the Structure of Single-Walled Carbon Nanotubes", J. Phys. Chem., Feb. 12, 2003, B 107 3712-8.
Zhang et al. "Method for anisotropic etching of graphite or graphene" Institute of Physics, Chinese Academy of Sciences; Peop. Rep. China; Mar. 30, 2011.
Zhang et al. "Production of Graphene Sheets by Direct Dispersion with Aromatic Healing Agents", Small, May 6, 2010, vol. 6, No. 10, 1100-1107.
Zhang et al. "Isolation and activity of an alpha-amylase inhibitor from white kidney beans," Yao xue xue bao=Acta pharmaceutica Sinica 42. 12 (Dec. 2007): 1282-7.
Zhao, et al. "Efficient preparation of large-area graphene oxide sheets for transparent conductive films." ACS nano 4.9 (2010): 5245-5252.
Zhou, K., et al., "One-pot preparation of graphene/ Fe304 composites by a solvothermal reaction," New J. Chem., 2010, 34, 2950.
Zhu et al. "Carbon Nanotubes in Biomedicine and Biosensing", Carbon Nanotubes-Growth and Applications, InTech, (Aug. 9, 2011) Chapter 6: pp. 135-162. Available from: https://www.intechopen.com/books/carbon-nanotubes-growth-and-applications/carbon-nanotubes-in-biomedicine-and-biosensing.
Ziegelmeier et al. "Adipokines influencing metabolic and cardiovascular disease are differentially regulated in maintenance hemodialysis," Metabolism: clinical and experimental 57. 10 (Oct. 2008): 1414-21.
Zirk et al. "A refractometry-based glucose analysis of body fluids," Medical engineering & physics 29. 4 (May 2007): 449-58.
Zyga "Nanoporous Graphene Could Outperform Best Commercial Water Desalination Techniques," Phys.org., Jun. 22, 2012, Retrieved from http://www.phys.org/pdf259579929.pdf [Last Accessed Dec. 3, 2014] (3 pages).
CN Office Action in Chinese Application No. 201580006829.5 dated Aug. 1, 2017. (English translation) (8 pages).
EP Office Action for European Application No. 15743307.9 dated Aug. 8, 2017. (17 pages).
European Search Report dated Aug. 28, 2017 from related EP application 15743750.0. (7 pages).
IL Office Action in Israel Application No. 234685 dated Jun. 25, 2017. (2 pages).
International Search Report and Written Opinion dated Aug. 14, 2017 from related PCT application PCT/US2017/031537. (12 pages).
International Search Report and Written Opinion dated Jul. 5, 2017 from related PCT application PCT/US2017/024147. (16 pages).
Jiang, L. et al., Design of advanced porous grapheme materials: from grapheme nanomesh to 3D architectures. Nanoscale, Oct. 16, 2013, vol. 6, pp. 1922-1945.

(56) References Cited

OTHER PUBLICATIONS

JP Office Action in Japanese Application No. 2015-503405 dated Jun. 28, 2017. (English translation) (6 pages).
JP Office Action in Japanese Application No. 2015-549508 dated Jun. 27, 2017 (English translation) (7 pages).
Li, R.H. "Materials for immunoisolated cell transplantation". Adv. Drug Deliv. Rev. 33, 87-109 (1998).
Schweitzer, Handbook of Separation Techniques for Chemical Engineers, 1979, McGraw-Hill Book Company, pp. 2-5 to 2-8.
Search Report and Written Opinion dated Aug. 14, 2017 for Singapore Application No. 11201606287V. (10 pages).
Search Report and Written Opinion dated Aug. 22, 2017 for Singapore Application No. 11201607584P. (7 pages).
Sears et al., "Recent Developments in Carbon Nanotube Membranes for Water Purification and Gas Separation" Materials, vol. 3 (Jan. 4, 2010), pp. 127-149.
U.S. Notice of Allowance in U.S. Appl. No. 14/193,007 dated Sep. 6, 2017. (9 pages).
U.S. Notice of Allowance in U.S. Appl. No. 14/610,770 dated Sep. 26, 2017. (12 pages).
U.S. Notice of Allowance in U.S. Appl. No. 14/656,580 dated Sep. 5, 2017. (8 pages).
U.S. Notice of Allowance in U.S. Appl. No. 15/332,982 dated Sep. 21, 2017. (5 pages).
U.S. Office Action for U.S. Appl. No. 14/656,657 dated Jul. 7, 2017. (7 pages).
U.S. Office Action for U.S. Appl. No. 15/099,193 dated Jul. 19, 2017. (13 pages).
U.S. Office Action for U.S. Appl. No. 15/289,944 dated Jul. 13, 2017. (18 pages).
U.S. Office Action for U.S. Appl. No. 15/332,982 dated Aug. 18, 2017. (9 pages).
EPO Extended Search Report for European Application No. 171684883.5 dated Jul. 25, 2017 (8 pages).
EPO Supplementary Search Report for European Application No. 15762019.6 dated Aug. 9, 2017 (16 pages).
U.S. Office Action in U.S. Appl. No. 15/099,099 dated Oct. 5, 2017 (11 pages).
U.S. Office Action in U.S. Appl. No. 15/099,447 dated Oct. 3, 2017 (21 pages).
Weisen, et al., "Fabrication of nanopores in a graphene sheet with heavy ions: A molecular dynamics study", Journal of Applied Physics 114, 234304 (2013), pp. 234304-1 to 234304-6.
Australian Office Action in Application No. 2013235234 dated Dec. 19, 2017 (5 pages).
Japanese Office Action in Application No. 2017-002652 dated Nov. 24, 2017 (with English translation) (7 pages).
Chu, L., et al., "Porous graphene sandwich/poly(vinylidene fluoride) composites with high dielectric properties," Composites Science and Technology, 86, (2013), pp. 70-75.
European Extended Search Report in Application No. 15743307.9 dated Nov. 15, 2017 (14 pages).
European Extended Search Report in Application No. 15755350.4 dated Oct. 30, 2017 (9 pages).
European Extended Search Report in Application No. 15762019.6 dated Nov. 20, 2017 (12 pages).
European Extended Search Report in Application No. 15762213.5 dated Oct. 10, 2017 (8 pages).
Gu et al., "One-step synthesis of porous graphene-based hydrogels containing oil droplets for drug delivery", Royal Society of Chemistry (RSC), vol. 4, No. 7, Jan. 1, 2014, pp. 3211-3218.
Japanese Office Action in Application No. 2015-549508 dated Nov. 7, 2017 (with English translation) (2 pages).
Kim et al., "Selective Gas Transport Through Few-Layered Graphene and Graphene Oxide Membranes", Science, vol. 342, Oct. 4, 2013, pp. 91-95 (6 total pages).
Singapore Search Report and Written Opinion in Application No. 11201609272T dated Oct. 5, 2017 (11 pages).
U.S. Notice of Allowance in U.S. Appl. No. 15/099,464 dated Nov. 16, 2017 (5 pages).

U.S. Notice of Allowance in U.S. Appl. No. 15/332,982 dated Nov. 1, 2017 (9 pages).
U.S. Office Action in U.S. Appl. No. 14/707,808 dated Nov. 6, 2017 (27 pages).
U.S. Office Action in U.S. Appl. No. 15/099,193 dated Dec. 28, 2017 (25 pages).
U.S. Office Action in U.S. Appl. No. 15/099,304 dated Nov. 24, 2017 (23 pages).
Wang, M., et al., "Interleaved Porous Laminate Composed of Reduced Graphene Oxide Sheets and Carbon Black Spacers by In-Situ Electrophoretic Deposition," The Royal Society of Chemistry (2014), pp. 1-3.
Wimalasiri, Y., et al., "Carbon nanotube/graphene composite for enhanced capacitive deionization performance," Carbon 59 (2013), pp. 464-471.
Bose et al.,"Microfabricated immune-isolating devices for transplanting therapeutic cells in vivo", Koch Institute of Integrative Cancer Research, Massachusetts Institute of Technology, Undated (1 page).
Indian Office Action for Appl. Ser. No. 7731/DELNP/2014 dated Jul. 26, 2018 (6 pages).
Japanese Office Action for Appl. Ser. No. 2017-002652 dated Jul. 3, 2018 (8 pages).
Linnert, "Welding Metallurgy—Carbon and Alloy Steels", vol. I—Fundamentals (4th Edition), Chapter 2—The Structure of Metals, GML Publications, American Welding Society (AWS), Year: 1994, pp. 17-74. Retrieved from app.knovel.com/hotlink/pdf/id:kt0095RCL3/welding-metallurgy-carbon/structure-metals.
U.S. Final Office Action for U.S. Appl. No. 14/707,808 dated Jun. 27, 2018 (28 pages).
U.S. Final Office Action for U.S. Appl. No. 15/099,482 dated Aug. 27, 2018 (10 pages).
U.S. Non-Final Office Action for U.S. Appl. No. 15/099,239 dated Jul. 12, 2018 (31 pages).
U.S. Non-Final Office Action for U.S. Appl. No. 15/099,304 dated Aug. 27, 2018 (22 pages).
U.S. Notice of Allowance for U.S. Appl. No. 15/099,420 dated Aug. 8, 2018 (8 pages).
Vatanpour et al., "Fabrication and characterization of novel antifouling nanofiltration membrane prepared from oxidized multiwalled carbon nanotube/polyethersulfone nanocomposite", Journal of Membrane Science, vol. 375, Elsevier, Apr. 6, 2011, pp. 284-294.
Zhang et al., "Synergetic effects of oxidized carbon nanotubes and graphene oxide on fouling control and anti-fouling mechanism of polyvinylidene fluoride ultrafiltration membranes", Journal of Membrane Science, vol. 448, Elsevier, Aug. 7, 2013, pp. 81-92.
European Extended Search Report in Application No. 15837617.8 dated Mar. 22, 2018 (9 pages).
Singapore Written Opinion for Appl. Ser. No. 11201607584P dated Jun. 8, 2018 (7 pages).
U.S. Non-Final Office Action for U.S. Appl. No. 15/099,410 dated Jun. 13, 2018 (15 pages).
U.S. Notice of Allowance for U.S. Appl. No. 15/453,441 dated Jun. 12, 2018 (8 pages).
U.S. Office Action for U.S. Appl. No. 15/099,056 dated May 29, 2018 (33 pages).
U.S. Office Action for U.S. Appl. No. 15/099,289 dated Jun. 7, 2018 (16 pages).
Office Action for Indian Appl. Ser. No. 1566/DELNP/2013 dated Feb. 2, 2018 (7 pages).
Office Action for Japanese Appl. Ser. No. 2016-521448 dated Mar. 16, 2018 (5 pages).
Skrzypek et al., "Pancreatic islet macroencapsulation using microwell porous membranes", Scientific Reports, 7: 9186 | DOI:10.1038/s41598-017-09647-7, Aug. 23, 2017 (12 pages).
U.S. Notice of Allowance for U.S. Appl. No. 15/099,464 dated Feb. 28, 2018 (5 pages).
U.S. Office Action for U.S. Appl. No. 15/099,276 dated Mar. 22, 2018 (13 pages).
U.S. Office Action for U.S. Appl. No. 15/453,441 dated Mar. 22, 2018 (7 pages).
U.S. Final Office Action for U.S. Appl. No. 15/099,289 dated Oct. 15, 2018 (14 pages).

(56) References Cited

OTHER PUBLICATIONS

U.S. Non-Final Office Action for U.S. Appl. No. 14/656,657 dated Oct. 10, 2018 (6 pages).
U.S. Non-Final Office Action for U.S. Appl. No. 14/707,808 dated Nov. 15, 2018 (34 pages).
U.S. Non-Final Office Action for U.S. Appl. No. 15/099,099 dated Sep. 27, 2018 (13 pages).
U.S. Non-Final Office Action for U.S. Appl. No. 15/099,269 dated Oct. 5, 2018 (11 pages).
U.S. Non-Final Office Action for U.S. Appl. No. 15/099,276 dated Nov. 1, 2018 (13 pages).
U.S. Notice of Allowance for U.S. Appl. No. 15/099,056 dated Nov. 16, 2018 (8 pages).
Chen et al., "Hierarchically porous graphene-based hybrid electrodes with excellent electrochemical performance", Journal of Materials Chemistry A: Materials for Energy and Sustainability, vol. 1, No. 33, Jan. 1, 2013, pp. 9409-9413.
Chinese Office Action in Application No. 201580006829.5 dated Jan. 23, 2018 (with English translation) (13 pages).
European Extended Search Report in Application No. 15786691.4 dated Dec. 1, 2017 (10 pages).
European Extended Search Report in Application No. 15789852.9 dated Dec. 6, 2017 (8 pages).
Japanese Office Action in Application No. 2017-042023 dated Jan. 9, 2018 (with English translation) (9 pages).
Singapore Search Report and Written Opinion in Application No. 11201701654U dated Dec. 6, 2017 (6 pages).
Taiwanese Office Action in Application No. 102146079 dated Dec. 12, 2017 (with English translation) (4 pages).
U.S. Notice of Allowance in U.S. Appl. No. 14/843,944 dated Feb. 9, 2018 (9 pages).
U.S. Office Action for U.S. Appl. No. 15/099,482 dated Feb. 23, 2018 (9 pages).
U.S. Office Action in U.S. Appl. No. 14/656,190 dated Jan. 10, 2018 (14 pages).
U.S. Office Action in U.S. Appl. No. 14/856,471 dated Jan. 11, 2018 (36 pages).
U.S. Office Action in U.S. Appl. No. 15/099,099 dated Feb. 15, 2018 (13 pages).
U.S. Office Action in U.S. Appl. No. 15/099,588 dated Feb. 1, 2018 (6 pages).
Wang et al., "Preparation of high-surface-area carbon nanoparticle/graphene composites", Carbon, Elsevier, Oxford, GB, vol. 50, No. 10, Apr. 8, 2012, pp. 3845-3853.
U.S. Appl. No. 61/452,704, filed Mar. 15, 2011, Russo et al.
Apel et al. "Effect of nanosized surfactant molecules on the etching or ion tracks: New degrees or freedom in design of pore shape", Nuclear Instruments and Methods in Physics Research Section B: Beam Interactions with Materials and Atoms, vol. 209, Aug. 2003, pp. 329-344.
Australian Office Action for Appl. Ser. No. 2015252784 dated Mar. 25, 2019 (11 pages).
Australian Office Action for Appl. Ser. No. 2015255756 dated Feb. 22, 2019 (5 pages).
Extended European Search Report for Appl. Ser. No. 16833430.8 dated Apr. 25, 2019 (11 pages).
Extended European Search Report for Appl. Ser. No. 16833432.4 dated Apr. 16, 2019 (14 pages).
Extended European Search Report for Appl. Ser. No. 16833433.2 dated Mar. 4, 2019 (15 pages).
International Search Report and Written Opinion for PCT Appl. Ser. No. PCT/US2018/065514 (16 pages).
Japanese Office Action for Appl. Ser. No. 2016-565216 dated Feb. 26, 2019 (7 pages).
Kim et al., "High quality reduced graphene oxide through repairing with multi-layered graphene ball nanostructures", Scientific Reports, vol. 3, No. 1, Nov. 19, 2013, pp. 1-6.
Singapore Written Opinion for Appl. Ser. No. 11201800845X dated Feb. 26, 2019 (8 pages).
Singapore Written Opinion for Appl. Ser. No. 11201800883R dated Feb. 22, 2019 (7 pages).
Singapore Written Opinion for Appl. Ser. No. 11201800968Q dated Feb. 19, 2019 (6 pages).
U.S. Final Office Action for U.S. Appl. No. 15/099,269 dated Apr. 18, 2019 (7 pages).
U.S. Final Office Action for U.S. Appl. No. 15/099,304 dated Apr. 19, 2019 (27 pages).
U.S. Non-Final Office Action for U.S. Appl. No. 14/656,657 dated Mar. 28, 2019 (9 pages).
U.S. Non-Final Office Action for U.S. Appl. No. 14/686,452 dated May 3, 2019 (7 pages).
U.S. Non-Final Office Action for U.S. Appl. No. 15/099,193 dated May 2, 2019 (19 pages).
U.S. Non-Final Office Action for U.S. Appl. No. 15/410,457 dated Feb. 28, 2019 (13 pages).
Canadian Office Action for Appl. Ser. No. 2,865,648 dated Jan. 16, 2019 (4 pages).
EPO Office Action for Appl. Ser. No. 13714806.0 dated Dec. 5, 2018 (6 pages).
EPO Office Action for Appl. Ser. No. 15786691.4 dated Dec. 5, 2018 (6 pages).
Extended European Search Report for Appl. Ser. No. 16833431.6 dated Feb. 25, 2019 (16 pages).
Koenig et al., "Selective Molecular Sieving Through Porous Graphene", Nature Nanotechnology, vol. 7, No. 11, pp. 728-732 (Including Supplementary Informaton) (23 pages).
U.S. Advisory Action for U.S. Appl. No. 15/099,289 dated Jan. 8, 2019 (6 pages).
U.S. Final Office Action for U.S. Appl. No. 14/686,452 dated Dec. 13, 2018 (6 pages).
U.S. Final Office Action for U.S. Appl. No. 15/099,099 dated Jan. 2, 2019 (13 pages).
U.S. Final Office Action for U.S. Appl. No. 15/099,239 dated Feb. 21, 2019 (26 pages).
U.S. Non-Final Office Action for U.S. Appl. No. 15/099,482 dated Jan. 31, 2019 (13 pages).
U.S. Notice of Allowance for U.S. Appl. No. 15/099,289 dated Jan. 18, 2019 (7 pages).
U.S. Notice of Allowance for U.S. Appl. No. 15/099,410 dated Jan. 3, 2019 (9 pages).
CN Office Action in Chinese Application No. 201380013988.9 dated Aug. 18, 2016 (English translation not readily available).
Cohen-Tanugi, "Nanoporous graphene as a water desalination membrane," (Ph.D. Thesis, Massachusetts Institute of Technology) (Jun. 2015).
International Search Report and Written Opinion in PCT/US2015/020296 dated Jun. 17, 2015.
U.S. Notice of Allowance in U.S. Appl. No. 14/610,770 dated Aug. 12, 2016.
U.S. Office Action in U.S. Appl. No. 14/656,190 dated Aug. 29, 2016.
U.S. Office Action for U.S. Appl. No. 14/656,580 dated Jun. 2, 2016.
U.S. Office Action in U.S. Appl. No. 14/819,273 dated Jul. 6, 2016.
U.S. Office Action for U.S. Appl. No. 14/856,198 dated Jun. 3, 2016.
Yoon, "Simulations show how to turn graphene's defects into assets," ScienceDaily (Oct. 4, 2016), www.sciencedaily.com/releases/2016/10/161004120428.htm.
Zhang et al. Modern Thin-Film Technology 284-285 (Metallurgical Industry Press, 1st ed. 2009) (English translation not readily available).
U.S. Notice of Allowance in U.S. Appl. No. 14/610,770 dated Jan. 23, 2017.
U.S. Notice of Allowance in U.S. Appl. No. 14/856,198 dated Feb. 10, 2017.
U.S. Notice of Allowance in U.S. Appl. No. 14/856,198 dated Mar. 1, 2017.
U.S. Office Action in U.S. Appl. No. 14/193,007 dated Mar. 23, 2017.
U.S. Office Action in U.S. Appl. No. 14/656,580 dated Feb. 9, 2017.
U.S. Office Action in U.S. Appl. No. 14/843,944 dated Jan. 6, 2017.

(56) References Cited

OTHER PUBLICATIONS

U.S. Office Action in U.S. Appl. No. 15/099,464 dated Mar. 10, 2017.
Adiga et al., "Nanoporous Materials for Biomedical Devices," JOM 60: 26-32 (Mar. 25, 2008).
Allen et al., "Craters on silicon surfaces created by gas cluster ion impacts," Journal of Applied Physics, 92(7): 3671-8 (Oct. 2002).
AMI Applied Membranes Inc. (undated). FilmTec Nanofiltration Membrane Elements. Retrieved Jun. 1, 2016, from http://www.appliedmembranes.com/filmtec-nanofiltration-membrane-elements.html.
Apel, "Track etching technique in membrane technology," Radiation Measurements 34(1-6): 559-566 (Jun. 2001).
Atmeh et al., "Albumin Aggregates: Hydrodynamic Shape and Physico-Chemical Properties," Jordan Journal of Chemistry, 2(2): 169-182 (2007).
Bae et al., "Roll-to-roll production of 30-inch graphene films for transparent electrodes," Nature Nanotechnology 5: 574-578 (Jun. 20, 2010).
Bai et al., "Graphene nanomesh," Nature Nanotechnology 5: 190-194 (Feb. 14, 2010).
Baker. (2004). "Track-etch Membranes." In Membrane Technology and Applications (2nd ed., pp. 92-94). West Sussex, England: John Wiley & Sons.
Butler et al. "Progress, Challenges, and Opportunities in Two-Dimensional Materials Beyond Graphene", Materials Review 7(4): 2898-2926 (Mar. 6, 2013).
Chen et al., "Mechanically Strong, Electrically Conductive, and Biocompatible Graphene Paper," Adv. Mater., 20(18): 3557-3561 (Sep. 2008) (available online Jul. 2008).
Chhowalla et al., "The chemistry of two-dimensional layered transition metal dichalcogenide nanosheets," Nature Chemistry 5: 263-275 (Mar. 20, 2013).
Childres et al., "Effect of oxygen plasma etching on graphene studied using Raman spectroscopy and electronic transport measurements," New Journal of Physics 13 (Feb. 10, 2011).
Clochard. (undated). Radiografted track-etched polymer membranes for research and application [Scholarly project]. In Laboratoire Des Solides Irradiés. Retrieved Jun. 2, 2016, from http://iramis.cea.fr/radiolyse/5juin2015/Clochard.pdf.
Cohen-Tanugi et al, "Water Desalination across Nanoporous Graphene," ACS Nano Letters 12(7): 3602-3608 (Jun. 5, 2012).
Colton, "Implantable biohybrid artificial organs," Cell Transplantation 4(4): 415-436 (Jul.-Aug. 1995).
Desai et al., "Nanoporous microsystems for islet cell replacement," Advanced Drug Delivery Reviews 56: 1661-1673 (Jul. 23, 2004).
Dong et al., "Growth of large-sized graphene thin-films by liquid precursor-based chemical vapor deposition under atmospheric pressure," Carbon 49(11): 3672-3678 (May 2011).
Fischbein et al., "Electron beam nanosculpting of suspended graphene sheets," Applied Physics Letters 93(113107): 1-3, (Sep. 16, 2008).
Fissell et al., "High-Performance Silicon Nanopore Hemofiltration Membranes," NIH-PA Author Manuscript, PMC, (Jan. 5, 2010), also published in J. Memb. Sci. 326(1): 58-63 (Jan. 5, 2009).
Fuertes et al., "Carbon composite membranes from Matrimid® and Kapton® polyimides for gas separation," Microporous and Mesoporous Materials, 33: 115-125 (Dec. 1999).
Galashev, "Computer study of the removal of Cu from the graphene surface using Ar clusters," Computational Materials Science, 98:123-128 (Feb. 2015) (available online Nov. 2014).
Gimi et al., "A Nanoporous, Transparent Microcontainer for Encapsulated Islet Therapy," J. Diabetes Sci. Tech. 3(2): 1-7 (Mar. 2009).
Hong et al., "Graphene multilayers as gates for multi-week sequential release of proteins from surfaces," NIH-PA Author Manuscript PMC (Jun. 1, 2014), also published in ACS Nano, Jan. 24, 2012; 6(1): 81-88 (first published online Dec. 29, 2011).
Hu et al., "Enabling graphene oxide nanosheets as water separation membranes," Environmental Science & Technology 47(8): 3715-3723 (Mar. 14, 2013).
International Search Report and Written Opinion in PCT/US2015/013805 dated Apr. 30, 2015.
International Search Report and Written Opinion in PCT/US2015/018114 dated Jun. 3, 2015.
International Search Report and Written Opinion in PCT/US2015/020246 dated Jun. 10, 2015.
International Search Report and Written Opinion in PCT/US2015/028948 dated Jul. 16, 2015.
International Search Report and Written Opinion in PCT/US2015/029932 dated Oct. 6, 2015.
International Search Report and Written Opinion in PCT/US2016/027607 dated Jul. 22, 2016.
International Search Report and Written Opinion in PCT/US2016/027616 dated Jul. 22, 2016.
International Search Report and Written Opinion in PCT/US2016/027596 dated Jul. 22, 2016.
International Search Report and Written Opinion in PCT/US2016/027603 dated Jul. 22, 2016.
International Search Report and Written Opinion in PCT/US2016/027610 dated Jul. 22, 2016.
International Search Report and Written Opinion in PCT/US2016/027612 dated Jul. 22, 2016.
International Search Report and Written Opinion in PCT/US2016/027637 dated Jun. 22, 2016.
International Search Report in PCT/US15/20201 dated Jun. 10, 2015.
International Search Report in PCT/US2015/048205 dated Dec. 4, 2015.
Inui et al., "Molecular dynamics simulations of nanopore processing in a graphene sheet by using gas cluster ion beam," Appl. Phys. A, 98: 787-794 (Mar. 2010) (available online Dec. 2009).
Jiang et al., "Porous Graphene as the Ultimate Membrane for Gas Separation," Nano Letters 9(12): 4019-4024 (Sep. 23, 2009).
Joshi et al., "Precise and ultrafast molecular sieving through graphene oxide membranes", Science 343(6172): 752-754 (Feb. 14, 2014).
Kanani et al., "Permeability—Selectivity Analysis for Ultrafiltration: Effect of Pore Geometry," NIH-PA Author Manuscript, PMC, (Mar. 1, 2011), also published in J. Memb. Sci. 349(1-2): 405 (Mar. 1, 2010).
Karan et al., "Ultrafast Viscous Permeation of Organic Solvents Through Diamond-Like Carbon Nanosheets," Science 335: 444-447 (Jan. 27, 2012).
Kim et al., "Fabrication and Characterization of Large Area, Semiconducting Nanoperforated Graphene Materials," Nano Letters 10(4): 1125-1131 (Mar. 1, 2010).
Kim et al., "The structural and electrical evolution of graphene by oxygen plasma-induced disorder," Nanotechnology IOP 20(375703): 1-8 (Aug. 26, 2009).
Koh et al., "Sensitive NMR Sensors Detect Antibodies to Influenza," NIH PA Author Manuscript PMC (Apr. 2009), also published in Angew. Chem. Int'l. Ed. Engl, 47(22): 4119-4121 (May 2008) (available online Apr. 2008).
Koski and Cui, "The New Skinny in Two-Dimensional Nanomaterials", ACS Nano 7(5): 3739-3743 (May 16, 2013).
Kurapati et al., "Graphene oxide based multilayer capsules with unique permeability properties: facile encapsulation of multiple drugs," Chemical Communication 48: 6013-6015 (Apr. 25, 2012).
Lehtinen et al., "Cutting and controlled modification of graphene with ion beams," Nanotechnology, 22: 175306 (8 pages) (Mar. 2011).
Li et al., "3D graphene oxide-polymer hydrogel: near-infrared light-triggered active scaffold for reversible cell capture and on-demand release," Advanced Materials 25: 6737-6743 (Oct. 7, 2013).
Liu et al., "Atomically Thin Molybdenum Disulfide Nanopores with High Sensitivity for DNA Translocation," ACS Nano 8(3): 2504-2511 (Feb. 18, 2014).
Liu et al., "Graphene Oxidation: Thickness-Dependent Etching and Strong Chemical Doping," Nano Letters 8(7): 1965-1970 (Jun. 19, 2008).
Marquardt et al., "Hybrid materials of platinum nanoparticles and thiol-functionalized graphene derivatives," Carbon 66: 285-294 (Jan. 2014; first published online Sep. 12, 2013).

(56) References Cited

OTHER PUBLICATIONS

Matteucci et al., "Chapter 1: Transport of gases and Vapors in Glass and Rubbery Polymers," in Materials Science of Membranes for Gas and Vapor Separation (Yampolskii et al eds. 2006) (available online Jun. 2006).
Mishra et al., "Functionalized Graphene Sheets for Arsenic Removal and Desalination of Sea Water," Desalination 282: 39-45 (Nov. 1, 2011).
Morse, "Scalable Synthesis of Semiconducting Nanopatterned Graphene Materials," InterNano Resources for Nanomanufacturing (undated). Retrieved Jun. 2, 2016 from: http://www.internano.org/node/345.
Nair et al., "Unimpeded Permeation of Water Through Helium-Leak-tight Graphene-Based Membranes," Science 335: 442-444 (Jan. 27, 2012).
Nam et al., "Monodispersed PtCo nanoparticles on hexadecyltrimethylammonium bromide treated graphene as an effective oxygen reduction reaction catalyst for proton exchange membrane fuel cells," Carbon 50: 3739-3747 (Aug. 2012) (available online Apr. 2012).
Nandamuri et al., "Chemical vapor deposition of graphene films," Nanotechnology 21(14): 1-4 (Mar. 10, 2010).
Nayini et al., "Synthesis and characterization of functionalized carbon nanotubes with different wetting behaviors and their influence on the wetting properties of carbon nanotubes/polymethylmethacrylate coatings," Progress in Organic Coatings, 77(6): 1007-1014 (Jun. 2014) (available online Mar. 2014).
O'Hern et al. "Selective Molecular Transport through Intrinsic Defects in a Single Layer of CVD Graphene," ACS Nano, 6(11): 10130-10138 (Oct. 2, 2012).
O'Hern et al., "Selective Ionic Transport through Tunable Subnanometer Pores in Single-Layer Graphene Membranes," Nano Letters 14(3): 1234-1241 (Feb. 3, 2014).
O'Hern, "Development of process to transfer large areas of LPCVD graphene from copper foil to a porous support substrate," 1-62 (M.S. Thesis, Massachusetts Institute of Technology) (Sep. 2011).
Paul, "Creating New Types of Carbon-Based Membranes," Science 335: 413-414 (Jan. 27, 2012).
Plant et al., "Size-dependent propagation of Au nanoclusters through few-layer graphene," Nanoscale, 6: 1258-1263 (2014) (available online Oct. 2013).
Popok. "Cluster Ion Implantation in Graphite and Diamond: Radiation Damage and Stopping of Cluster Constituents," Reviews on Advanced Materials Science 38(1): 7-16 (2014).
Russo et al., "Atom-by-atom nucleation and growth of graphene nanopores," PNAS, 109(16): 5953-5957 (Apr. 2012).
Schweicher et al., "Membranes to achieve immunoprotection of transplanted islets," NIH-PA Author Manuscript, PMC, (Nov. 13, 2014), also published in Frontiers in Bioscience (Landmark Ed) 19: 49-76 (Jan. 1, 2014).
Sint et al., "Selective Ion Passage through Functionalized Graphene Nanopores," JACS 130: 16448-16449 (Nov. 14, 2008).
Suk et al., "Water Transport Through Ultrathin Graphene," Journal of Physical Chemistry Letters 1(10): 1590-1594 (Apr. 30, 2010).
Sun et al., "Growth of graphene from solid carbon sources," Nature 468(7323): 549-552 (Nov. 25, 2010; including corrigendum in Nature 471(7336): 124 (Mar. 2011).
Tan et al., "Beta-cell regeneration and differentiation: how close are we to the 'holy grail'?" J. Mol. Encodrinol. 53(3): R119-R129 (Dec. 1, 2014).
Tang et al., "Highly wrinkled cross-linked graphene oxide membranes for biological and charge-storage applications," Small 8(3): 423-431 (Feb. 6, 2012; first published online Dec. 13, 2011).
Vlassiouk et al., "Versatile ultrathin nanoporous silicon nitride membranes," Proc. Natl. Acad. Sci. USA 106(50): 21039-21044 (Dec. 15, 2009).
Wadvalla, "Boosting agriculture through seawater," Nature Middle East (Jul. 2, 2012). Retrieved Jun. 1, 2016 from: natureasia.com/en/nmiddleeast/article/10.1038/nmiddleeast.2012.92?WT.mc_id=FBK NatureMEast].
Wikipedia, "Ion track." Jun. 1, 2016. Retrieved Jun. 1, 2016 from: en.wikipedia.org/wiki/ion_track.
Xu et al., "Graphene-like Two-Dimensional Materials", Chemical Reviews 113: 3766-3798 (Jan. 3, 2013).
Zabihi et al., "Formation of nanopore in a suspended graphene sheet with argon cluster bombardment: A molecular dynamics simulation study," Nuclear Instruments and Methods in Physics Research B, 343: 48-51 (Jan. 2015) (available online Nov. 2014).
Zan et al., "Graphene Reknits Its Holes," Nano Lett. 12(8): 3936-3940 (Jul. 5, 2012).
Zhao et al. "Two-Dimensional Material Membranes: An Emerging Platform for Controllable Mass Transport Applications," Small 10(22): 4521-4542 (Sep. 10, 2014).
Zhao et al., "Drilling Nanopores in Graphene with Clusters: A Molecular Dynamics Study," J. Phys. Chem. C, 116(21): 11776-1178 (2012) (available online May 2012).
Zhao et al., "Effect of Si02 substrate on the irradiation-assisted manipulation of supported graphene: a molecular dynamics study," Nanotechnology, 23(28):1-8 (Jul. 2012) (available online Jun. 2012).
Anasori et al., "2D metal carbides and nitrides (MXenes) for energy storage", Nature Reviews, vol. 2, Article No. 16098, Jan. 17, 2017, pp. 1-17.
Australian Office Action for Appl. Ser. No. 2018200090 dated Apr. 30, 2019 (4 pages).
Huang et al., "Ultrathin Carbon Molecular Sieve Films and Room-Temperature Oxygen Functionalization for Gas-Sieving", ACS Applied Maters & Interfaces 2019, vol. 11, Apr. 16, 2019, pp. 16729-16736.
Japanese Office Action for Appl. Ser. No. 2016-566751 dated Jun. 7, 2019 (8 pages).
Mojtabavi et al., "Single-Molecule Sensing Using Nanopores in Two-Dimensional Transition Metal Carbide (MXene) Membranes", American Chemical Society, ACS Nano 2019, vol. 13, Mar. 7, 2019, pp. 3042-3053.
Neumann et al., "Bottom-Up Synthesis of Graphene Monolayers with Tunable Crystallinity and Porosity", American Chemical Society, ACS Nano, May 21, 2019, pp. A-M (13 pages).
Pang et al., "Applications of 2D MXenes in energy conversion and storage systems", Chemical Society Review, 2019, vol. 48, No. 1, Jun. 25, 2018, pp. 72-133.
U.S. Advisory Action for U.S. Appl. No. 15/099,239 dated Jun. 21, 2019 (7 pages).
U.S. Final Office Action for U.S. Appl. No. 14/707,808 dated Jun. 26, 2019 (37 pages).
U.S. Non-Final Office Action for U.S. Appl. No. 15/308,351 dated Jun. 3, 2019 (9 pages).
U.S. Notice of Allowance for U.S. Appl. No. 15/099,269 dated Jun. 6, 2019 (8 pages).
Extended European Search Report for Appl. Ser. No. 16833429.0 dated Aug. 9, 2019 (14 pages).
Farah et al., "Long-Term Implant Fibrosis Prevention in Rodents and Non-Human Primates Using Crystallized Drug Formulations", Nature Materials, vol. 18, Aug. 2019, pp. 892-904.
Japanese Office Action for Appl. Ser. No. 2017-511982 dated Jul. 9, 2019 (6 pages).
Raimondo et al., "Functional muscle recovery with nanoparticle-directed M2 macrophage polarization in mice", Proceedings of the National Academy of Sciences of the United States of America (PNAS), Sep. 4, 2018, pp. 1-6.
University of Massachusetts Medical School, "Fibrosis Mitigation Pathway", PowerPoint Presentation, date of presentation unknown (6 pages).
U.S. Non-Final Office Action for U.S. Appl. No. 15/589,135 dated Aug. 1, 2019 (11 pages).
U.S. Notice of Allowance for U.S. Appl. No. 15/410,457 dated Aug. 14, 2019 (8 pages).
Yang et al., "Large-area graphene-nanomesh/carbon-nanotube hybrid membranes for ionic and molecular nanofiltration", Science, vol. 364, Jun. 14, 2019, pp. 1057-1062 (7 pages).
Zhang et al., "Rapid and Long-Term Glycemic Regulation with a Balanced Charged Immune-Evasive Hydrogel in T1DM Mice", Advanced Functional Materials, Advanced Science News, Jan. 30, 2019, pp. 1-9.

(56) References Cited

OTHER PUBLICATIONS

Zhang et al., "Rapid and Long-Term Glycemic Regulation with a Balanced Charged Immune-Evasive Hydrogel in T1DM Mice", Advanced Functional Materials, Advanced Science News, Jan. 30, 2019, Supporting Information (13 pages).

* cited by examiner (a)

(b)

PROCESSES FOR FORMING COMPOSITE STRUCTURES WITH A TWO-DIMENSIONAL MATERIAL USING A POROUS, NON-SACRIFICIAL SUPPORTING LAYER

CROSS-REFERENCE TO RELATED APPLICATIONS

This application claims the benefit of priority under 35 U.S.C. § 119 from U.S. Provisional Patent Application 61/934,537, filed Jan. 31, 2014, which is incorporated herein by reference in its entirety.

STATEMENT REGARDING FEDERALLY SPONSORED RESEARCH OR DEVELOPMENT

Not applicable.

FIELD

The present disclosure generally relates to atomically thin films, and, more specifically, to processes for manipulating graphene, graphene-based materials and other two-dimensional materials.

BACKGROUND

Graphene represents an atomically thin layer of carbon in which the carbon atoms reside within a single sheet or a few stacked sheets (e.g., about 20 or less) of fused six-membered rings forming an extended planar lattice of interconnected hexagonal molecules, although the planar lattice need not necessarily contain six-membered rings exclusively. In this context, graphene represents a planar arrangement of $sp^2$- and sp-hybridized carbon atoms that may or may not exhibit a long range crystalline order. In its various forms, graphene has garnered widespread interest for use in a number of applications, primarily due to its favorable combination of high electrical and thermal conductivity values, good in-plane mechanical strength, and unique optical and electronic properties. In many aspects, the properties of graphene parallel those of carbon nanotubes, since both nanomaterials are based upon an extended and electrically conjugated carbon framework. Other two-dimensional materials having an extended planar structure are also of interest for various applications. As used herein, the term "two-dimensional material" will refer to any extended planar structure of atomic thickness, including both single- and multi-layer variants thereof. Multi-layer two-dimensional materials can include up to about 20 stacked layers.

Because of its extended planar structure, graphene offers several features that are not shared with carbon nanotubes. Of particular interest to industry are large-area graphene films for applications such as, for example, special barrier layers, coatings, large area conductive elements (e.g., RF radiators or antennas), integrated circuits, transparent electrodes, solar cells, gas barriers, flexible electronics and the like. In addition, graphene films can be produced in bulk much more inexpensively at the present time than can carbon nanotubes.

Large-area graphene films of atomic thicknesses and containing single- or multi-layer graphene can be produced by a variety of chemical vapor deposition (CVD) processes. CVD growth takes place on a metal-containing growth substrate, such as a copper or nickel foil, and the graphene is strongly adhered to the growth substrate following synthesis. Even the outer graphene layers in multi-layer graphene, which are spatially separated from the surface of the growth substrate, can remain strongly adhered to the growth substrate. The strong adherence of graphene to its growth substrate can make intact removal of the graphene film difficult.

Metal growth substrates are often undesirable for use in downstream applications utilizing a graphene film. For example, chemical, electrical, or functional incompatibility can result when attempting to utilize a graphene film that is still adhered to or in contact with its metal growth substrate. Accordingly, it can often be desirable to transfer a graphene film from its metal growth substrate onto a secondary substrate, also referred to herein as a "functional substrate" or a "receiving substrate." The secondary substrate can exhibit properties that are better suited to meet the needs of a particular application.

Removing a graphene film from its growth substrate and subsequently transferring the graphene film to a secondary substrate can be difficult for a number of reasons. Although graphene has high mechanical strength on an atomic basis, it can be fairly fragile on the macroscale once it has been removed from its growth substrate. For example, tearing, fracturing and/or buckling can occur in the process of liberating a graphene film from its growth substrate. Tearing and buckling can produce poor surface conformality and coverage upon transferring the graphene film to a secondary substrate. Some processes for affecting removal of a graphene film from its growth substrate can also produce undesirable chemical damage to the graphene film, which can degrade its desirable properties.

One solution for addressing the difficulties posed by unsupported graphene films involves depositing a supporting layer on the graphene film that temporarily provides mechanical stabilization during the transfer process. Poly (methyl methacrylate) (PMMA) layers have been used in this regard. Once transfer to the secondary substrate is complete, the supporting layer is removed from the graphene film, meaning that the supporting layer is sacrificial and does not remain associated with the graphene film in its end deployment configuration. The use of a sacrificial supporting layer to promote transfer of graphene films can be undesirable for a number of reasons including, for example, incomplete layer removal following transfer, chemical damage to the graphene film and/or the secondary substrate during the layer removal process, poor surface conformality of the graphene film to the secondary substrate due to constrainment by the supporting layer, and potential incursion of the supporting layer into perforations within the graphene film. Chemicals used to affect removal of the sacrificial supporting layer can often be particularly incompatible with the polymer materials forming the secondary substrate. Further, the additional processing operations needed to deposit and then remove the sacrificial supporting layer can be undesirable from a time and cost standpoint.

In view of the foregoing, facile techniques for manipulating graphene films without using a sacrificial supporting layer would be of considerable benefit in the art. The present disclosure satisfies the foregoing need and provides related advantages as well.

SUMMARY

In various embodiments, processes for manipulating a two-dimensional material are described herein. In some embodiments, the processes can include providing a two-dimensional material adhered to a growth substrate, depositing a supporting layer on the two-dimensional material while the two-dimensional material is adhered to the growth substrate, and releasing the two-dimensional material from the growth substrate. The two-dimensional material remains in contact with the supporting layer following release of the two-dimensional material from the growth substrate.

In some embodiments, processes of the present disclosure can include providing a graphene or graphene-based film adhered to a growth substrate, perforating the film to introduce a plurality of pores therein, depositing a supporting layer on the film while the film is adhered to the growth substrate, and releasing the graphene or graphene-based film from the growth substrate. The graphene or graphene-based film remains in contact with the supporting layer following release of the film from the growth substrate. In some embodiments, the growth substrate includes a metal, and the supporting layer includes a plurality of pores.

In other embodiments, filtration membranes containing a perforated graphene or graphene-based material film and a supporting layer are described herein. The filtration membranes are prepared by a process that includes: providing a graphene or graphene-based film adhered to a growth substrate, perforating the film to introduce a plurality of pores therein, depositing a supporting layer on the film while the film is adhered to the growth substrate, and releasing the film from the growth substrate. The graphene or graphene-based film remains in contact with the supporting layer following release of the film from the growth substrate. In some embodiments, the growth substrate includes a metal, and the supporting layer includes a plurality of pores.

The foregoing has outlined rather broadly the features of the present disclosure in order that the detailed description that follows can be better understood. Additional features and advantages of the disclosure will be described hereinafter. These and other advantages and features will become more apparent from the description below taken in conjunction with the drawings.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
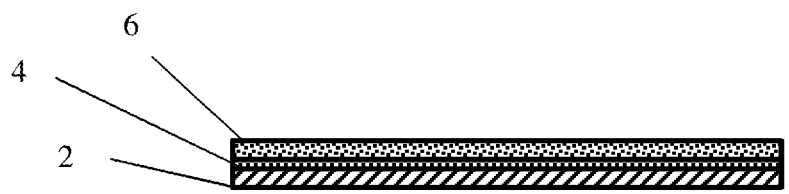
FIG. 1 shows an illustrative schematic of a graphene or graphene-based film sandwiched between a growth substrate and a supporting layer.

The present disclosure is directed, in part, to methods of forming composite structures comprising a non-sacrificial supporting layer and a graphene, graphene-based or other two-dimensional material. Graphene-based materials include, but are not limited to, single layer graphene, multilayer graphene or interconnected single or multilayer graphene domains and combinations thereof. In embodiments, multilayer graphene includes 2 to 20 layers, 2 to 10 layers or 2 to 5 layers. In embodiments, graphene is the dominant material in a graphene-based material. For example, a graphene-based material comprises at least 30% graphene, or at least 40% graphene, or at least 50% graphene, or at least 60% graphene, or at least 70% graphene, or at least 80% graphene, or at least 90% graphene, or at least 95% graphene. In embodiments, a graphene-based material comprises a range of graphene selected from 30% to 95%, or from 40% to 80% or from 50% to 70%.

As used herein, a "domain" refers to a region of a material where atoms are uniformly ordered into a crystal lattice. A domain is uniform within its boundaries, but different from a neighboring region. For example, a single crystalline material has a single domain of ordered atoms. In an embodiment, at least some of the graphene domains are nanocrystals, having domain sizes from 1 to 100 nm or 10-100 nm. In an embodiment, at least some of the graphene domains have a domain size greater than 100 nm up to 100 microns, or from 200 nm to 10 microns, or from 500 nm to 1 micron. "Grain boundaries" formed by crystallographic defects at edges of each domain differentiate between neighboring crystal lattices. In some embodiments, a first crystal lattice may be rotated relative to a neighboring second crystal lattice, by rotation about an axis perpendicular to the plane of a sheet, such that the two lattices differ in "crystal lattice orientation".

In an embodiment, the sheet of graphene-based material comprises a sheet of single or multilayer graphene or a combination thereof. In an embodiment, the sheet of graphene-based material is a sheet of single or multilayer graphene or a combination thereof. In another embodiment, the sheet of graphene-based material is a sheet comprising a plurality of interconnected single or multilayer graphene domains. In an embodiment, the interconnected domains are covalently bonded together to form the sheet. When the domains in a sheet differ in crystal lattice orientation, the sheet is polycrystalline.

In embodiments, the thickness of the sheet of graphene-based material is from 0.34 to 10 nm, from 0.34 to 5 nm, or from 0.34 to 3 nm. A sheet of graphene-based material may comprise intrinsic defects. Intrinsic defects are those resulting unintentionally from preparation of the graphene-based material in contrast to perforations which are selectively introduced into a sheet of graphene-based material or a sheet of graphene. Such intrinsic defects include, but are not limited to, lattice anomalies, pores, tears, cracks or wrinkles. Lattice anomalies can include, but are not limited to, carbon rings with other than 6 members (e.g. 5, 7 or 9 membered rings), vacancies, interstitial defects (including incorporation of non-carbon atoms in the lattice), and grain boundaries.

In an embodiment, the layer comprising the sheet of graphene-based material further comprises non-graphenic carbon-based material located on the a surface of the sheet of graphene-based material. In an embodiment, the non-graphenic carbon-based material does not possess long-range order and may be classified as amorphous. In embodiments, the non-graphenic carbon-based material further comprises elements other than carbon and/or hydrocarbons. Non-carbon materials which may be incorporated in the non-graphenic carbon-based material include, but are not limited to, hydrogen, hydrocarbons, oxygen, silicon, copper and iron. In embodiments, carbon is the dominant material in non-graphenic carbon-based material. For example, a non-graphenic carbon-based material comprises at least 30% carbon, or at least 40% carbon, or at least 50% carbon, or at least 60% carbon, or at least 70% carbon, or at least 80% carbon, or at least 90% carbon, or at least 95% carbon. In embodiments, a non-graphenic carbon-based material comprises a range of carbon selected from 30% to 95%, or from 40% to 80%, or from 50% to 70%.

The present disclosure is directed, in part, to processes for removing graphene, graphene-based material and other two-dimensional materials from their growth substrates. The present disclosure is also directed, in part, to processes for manipulating graphene, graphene-based material and other two-dimensional materials that are free of a growth substrate. The present disclosure is also directed, in part, to composite structures and filtration membranes formed from perforated graphene or graphene-based material that has been released from its growth substrate.

As discussed above, transferring graphene graphene-based material and other two-dimensional materials from a growth substrate to a secondary substrate can be exceedingly complicated. For example, mechanical damage and morphological changes can occur during the transfer process. Surface conformality of the transferred two-dimensional material on the secondary substrate can also be problematic. In this regard, if the secondary substrate is not sufficiently smooth, the transferred two-dimensional material can tear during deposition. The need for sufficient surface smoothness can severely limit candidate material choices for secondary substrates. Although some of the foregoing issues can be mitigated to a degree by using a sacrificial supporting layer (e.g., PMMA) to promote thin film transfer, sacrificial supporting layers can introduce their own set of problems, as discussed above. In addition, PMMA is not particularly flexible, which can be problematic for facilitating downstream applications.

Many applications for graphene, graphene-based material and other two-dimensional materials have been envisioned based upon the intentional introduction of a plurality of pores of defined size within the planar structure of these entities. As used herein, the term "pore" will refer to an aperture or hole extending through the thickness of graphene, graphene-based material or a similar two-dimensional material. Graphene, graphene-based material and other two-dimensional materials having intentionally introduced pores within their planar structure will be referred to herein as being "perforated," and the action of introducing pores will be referred to as "perforating." In a graphene or graphene-based sheet an interstitial aperture is formed by each six carbon atom ring structure in the sheet and this interstitial aperture is less than one nanometer across. In particular, this interstitial aperture, defined by the center-to-center distance between carbon atoms, is believed to be about 0.3 nanometers across its longest dimension. Perforation of sheets comprising two-dimensional network structures typically refers to formation of holes larger than the interstitial apertures in the network structure. Filtration represents an illustrative application that has been envisioned for perforated graphene, graphene-based material and other perforated two-dimensional materials, since substances of atomic or molecular dimensions can be effectively filtered by utilizing pores having a small enough size. Since graphene, graphene-based material and other two-dimensional materials are so thin, high flux rates can desirably be achieved even with very small pore sizes. This is not the case with filtration membranes having a thicker active filtration layer.

Sacrificial supporting layers can be particularly problematic for use in conjunction with perforated graphene, graphene-based material and other perforated two-dimensional materials, since their difficult removal can affect porosity of the planar structure. Chemical damage and effective sourcing of porous or permeable secondary substrates can also present issues when utilizing a transferred two-dimensional material as an active filtration layer. Moreover, sacrificial supporting layers that have been previously used in the art are believed to lack sufficient porosity to allow their direct use in applications making use of porosity within graphene, graphene-based material or a similar two-dimensional material.

The present inventors recognized that instead of using a sacrificial (temporary) supporting layer to promote transfer of graphene, graphene-based material and other two-dimensional materials to a secondary substrate, a non-sacrificial supporting layer can be effectively utilized to facilitate manipulation of these thin film materials in the form of a robust composite structure. As used herein, the term "non-sacrificial" refers to a supporting layer that remains associated with graphene, graphene-based material or another two-dimensional material in the two-dimensional material's terminal deployment. The properties of the non-sacrificial supporting layer can be chosen or tailored for compatibility with the particular terminal deployment. Elimination of a sacrificial supporting layer provides fewer opportunities for damaging the two-dimensional material during processing and benefits in the form of time and material savings. In addition, various non-sacrificial supporting layers can be readily deposited or formed with porosity established therein, which can be particularly useful in combination with perforated two-dimensional materials for filtration and other applications.

A number of different types of supporting layers, both polymeric and non-polymeric, can be utilized in conjunction with the embodiments of the present disclosure. The particular material utilized in the supporting layer can be chosen based upon the chemical or physical environment into which the graphene, graphene-based material or other two-dimensional material is being terminally deployed. Moreover, a number of processes can be used to deposit the supporting layer, thereby allowing considerable flexibility to be realized in its composition and morphology. Further advantages of such approaches are discussed hereinbelow.

In some embodiments, a non-sacrificial supporting layer of the present disclosure can be used to promote transfer of graphene, graphene-based material or another two-dimensional material to a secondary substrate. When used in this manner, the two-dimensional material can be sandwiched between the supporting layer and the secondary substrate, or the supporting layer can be sandwiched between the two-dimensional material and the secondary substrate. In either case, the non-sacrificial supporting layer does not significantly compromise the ability of the two-dimensional material to perform its intended function. For example, in filtration applications, a porous, non-sacrificial supporting layer can allow a perforated two-dimensional material to function as an active filtration layer by allowing free liquid or gas passage to take place upstream and/or downstream of the two-dimensional material. In configurations where the two-dimensional material is sandwiched between the secondary substrate and the supporting layer, the pores within the supporting layer can be effective to pre-filter large particles before they have an opportunity to plug the smaller pores within the two-dimensional material.

In some embodiments, a number of non-sacrificial supporting layers can be directly deposited in a porous or permeable condition, or porosity can be created within the supporting layer after its deposition on the two-dimensional material. In either case, the porosity within the supporting layer can be of a sufficient magnitude to allow access to the pores within a perforated two-dimensional material on which the supporting layer is deposited. For example, a porous or permeable, non-sacrificial supporting layer deposited on a perforated two-dimensional material can constitute at least a portion of a filtration membrane in various embodiments of the present disclosure. Such filtration membranes can display more consistent filtration properties than similar membranes prepared by transferring the two-dimensional material to a secondary substrate through use of a sacrificial supporting layer.

Accordingly, the processes described herein allow graphene, graphene-based material and other two-dimensional materials to be used in conjunction with a much broader array of materials than would otherwise be possible. Further, by depositing a polymer or other supporting layer substance directly on a two-dimensional material, better surface coverage and morphological properties can be attained than by performing the reverse and conventional process of depositing a previously synthesized two-dimensional material onto an existing substrate. The processes of the present disclosure allow for improved physical and chemical interactions to take place between the two-dimensional material and the supporting layer. In addition, a direct deposit approach may decrease or prevent delamination of the two-dimensional material and supporting layer by improving adhesion between the layers. As an additional advantage, direct deposition approaches of the present disclosure can decrease the likelihood of trapping debris between the two-dimensional material and the supporting layer, or mitigate damage caused by trapped debris.

Figure 7:
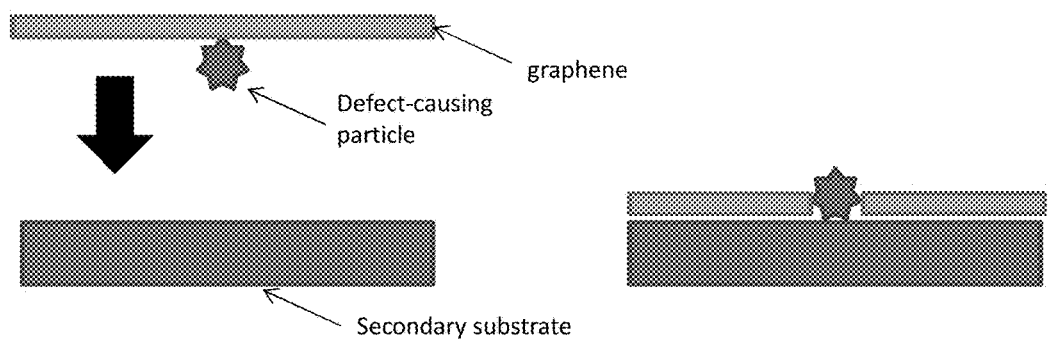
FIG. 7 shows an illustrative schematic of damage caused by debris disposed between graphene or a graphene-based material and a secondary substrate when (a) graphene or a graphene-based material is applied to an existing secondary substrate and (b) a secondary substrate is applied to graphene or a graphene-based material.
Figure 7:
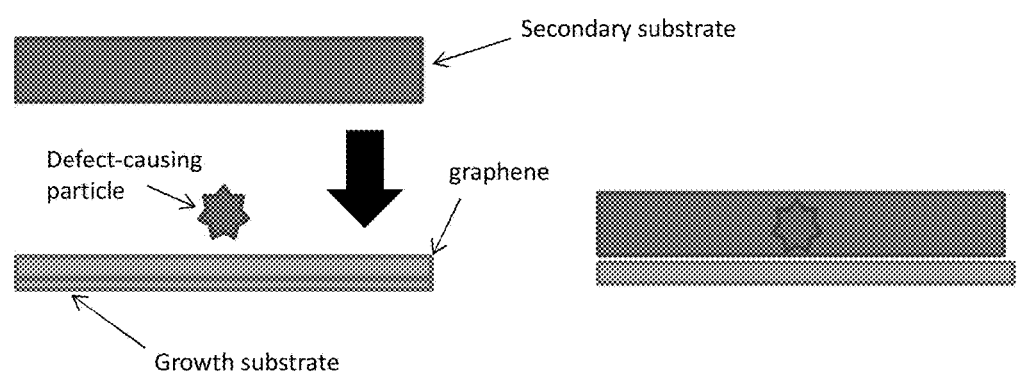
Figure 8:
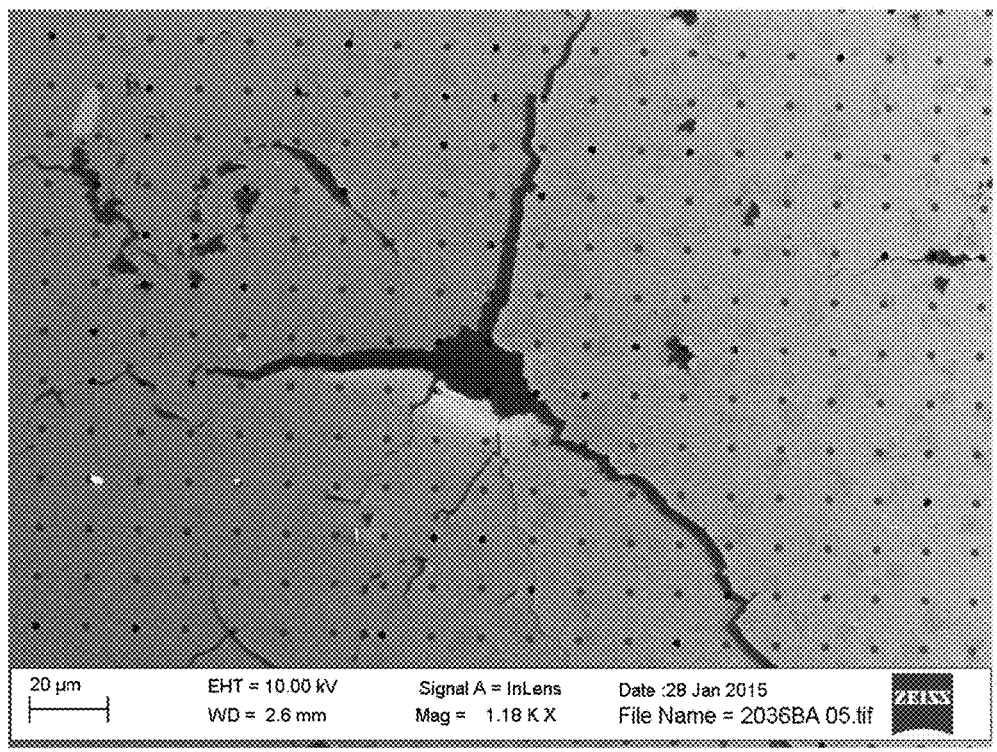
FIG. 8 shows an illustrative SEM image of damage to a graphene or graphene-based film caused by debris disposed between the film and an existing secondary substrate, as shown in FIG. 7(*a*).

FIG. 7 shows an illustrative schematic of damage caused by debris disposed between graphene or a graphene-based material and a secondary substrate when (a) graphene or a graphene-based material is applied to an existing secondary substrate and (b) a secondary substrate is applied to graphene or a graphene-based material. When graphene or a graphene-based material is applied to an existing substrate pressure is typically applied to encourage contact of the film and substrate. Such pressure may allow debris to break through the film, thereby creating damage of the type shown in FIG. 8, which shows an illustrative SEM image of damage to a graphene or graphene-based film caused by debris disposed between the film and an existing secondary substrate. In contrast, methods disclosed herein apply a secondary substrate to an existing graphene or graphene-based material. The secondary substrate is typically applied via a solution technique, a vapor deposition technique, an electrospinning technique or another technique that allows the secondary substrate to at least partially encapsulate any debris particles present on the graphene or graphene-based material.

Although the processes described herein can be particularly advantageous for use in conjunction with perforated two-dimensional materials, it is to be recognized that some or all of these advantages can also be recognized whether the two-dimensional material is perforated or not. For example, enhanced surface coverage and conformality on the supporting layers of the present disclosure can still be realized even if the two-dimensional material is not perforated. Moreover, the features and advantages of the present disclosure can be realized with non-sacrificial supporting layers that are either porous, permeable or substantially non-porous or permeable. Furthermore, although certain embodiments are described herein with graphene or graphene-based material as the two-dimensional material, it is to be recognized that other two-dimensional materials can be used similarly in alternative embodiments of the present disclosure unless otherwise specified herein. Thus, considerable flexibility can be realized by practicing the disclosure herein.

In various embodiments, processes for removing a two-dimensional material, such as graphene or graphene-based material, from its growth substrate can include: providing a two-dimensional material adhered to a growth substrate, depositing a supporting layer on the two-dimensional material while the two-dimensional material is adhered to the growth substrate, and releasing the two-dimensional material from the growth substrate. The two-dimensional material remains in contact with the supporting layer following release of the two-dimensional material from the growth substrate. The combination of the two-dimensional material in contact with the supporting layer defines a composite structure.

The two-dimensional material can be any substance having an extended planar molecular structure and an atomic level thickness. Particular examples of two-dimensional materials include graphene films, graphene-based material, transition metal dichalcogenides, α-boron nitride, silicene or germanene or other materials having a like planar structure. Specific examples of transition metal dichalcogenides include molybdenum disulfide and niobium diselenide. Graphene or graphene-based films according to the embodiments of the present disclosure can include single-layer or multi-layer films, or any combination thereof. Choice of a suitable two-dimensional material can be determined by a number of factors, including the chemical and physical environment into which the graphene, graphene-based material or other two-dimensional material is to be terminally deployed, ease of perforating the two-dimensional material, and the like.

FIG. 1 shows an illustrative schematic of a graphene or graphene-based film sandwiched between a growth substrate and a supporting layer. As depicted in FIG. 1, graphene or graphene-based film 4 is present on its original growth substrate 2. Graphene or graphene-based film 4 can be perforated or unperforated depending on the intended terminal deployment for the graphene or graphene-based film. Upon graphene or graphene-based film 4 is deposited supporting layer 6, such that graphene or graphene-based film 4 is sandwiched between growth substrate 2 and supporting layer 6. Supporting layer 6 can be porous, permeable or substantially non-porous or permeable, depending on its intended function, as well as the intended function of the graphene or graphene-based film.

Figure 2:
FIG. 2 shows an illustrative schematic of a graphene or graphene-based film in contact with only a supporting layer, following removal of a growth substrate to liberate the graphene or graphene-based film.

FIG. 2 shows an illustrative schematic of graphene or graphene-based film 4 in contact with only supporting layer 6, following removal of growth substrate 2 to liberate graphene or graphene-based film 4. A high degree of surface conformality is established between graphene or graphene-based film 4 and supporting layer 6, thereby maintaining mechanical support of graphene or graphene-based film 4. Although FIG. 2 has depicted complete removal of growth substrate 2, it is to be recognized that complete removal of growth substrate 2 need not necessarily take place. Instead, only a sufficient amount of removal of growth substrate 2 needs to take place to affect release of graphene film 4 and supporting layer 6 to produce the configuration depicted in FIG. 2. Removal of growth substrate 2 can involve etching the growth substrate with an etching solution. In alternative configurations, graphene or graphene-based film 4 and supporting layer 6 can be delaminated from growth substrate 2 in order to leave growth substrate 2 intact.

Figure 3:
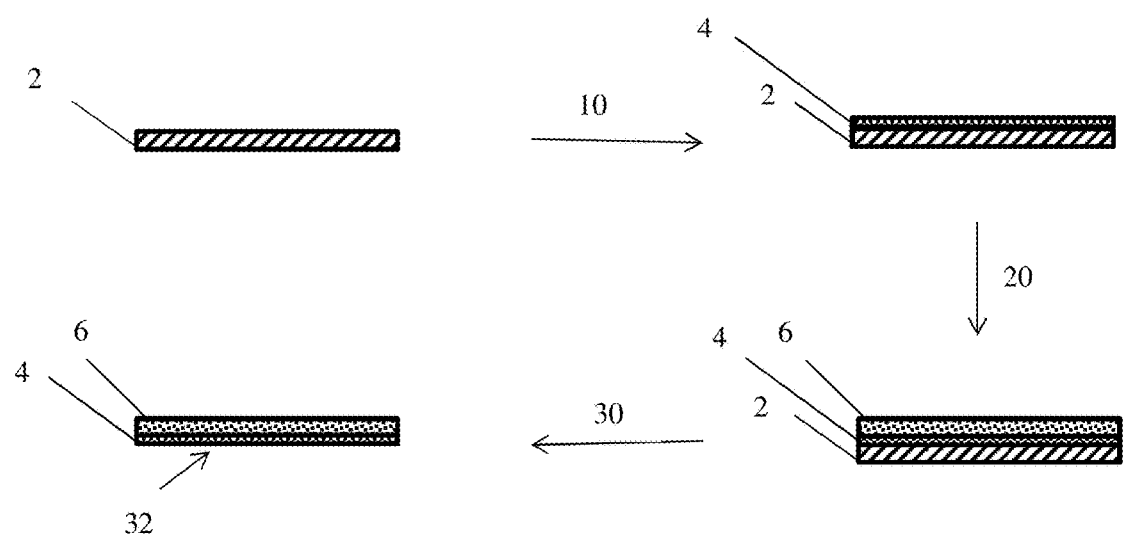
FIG. 3 shows a schematic of an illustrative process whereby a graphene or graphene-based film or other two-dimensional material can be formed on a growth substrate and undergo subsequent removal therefrom in supported form.

FIG. 3 shows a schematic of an illustrative process whereby a graphene or graphene-based film or other two-dimensional material can be formed on a growth substrate and undergo subsequent removal therefrom in supported form. As depicted in FIG. 3, graphene or graphene-based film 4 is deposited on growth substrate 2 during operation 10. Thereafter, in operation 20, supporting layer 6 is deposited on graphene or graphene-based film 4 while graphene or graphene-based film 4 is still present on growth substrate 2. Suitable techniques for forming, casting or depositing supporting layer 6 onto graphene or graphene-based film 4 are discussed in greater detail hereinbelow. Additional operations for introducing pores into graphene or graphene-based film 4 or supporting layer 6 are also discussed in further detail hereinbelow. Finally, in operation 30, growth substrate 2 is removed or released, leaving behind graphene or graphene-based film 4 supported by supporting layer 6, thereby defining composite structure 32.

In more particular embodiments, the growth substrate can include a metal. Various metals, particularly transition metals, can be effective for promoting growth of a two-dimensional material thereon. For example, in the case of graphene or graphene-based films, a copper substrate or a nickel substrate can be particularly effective as a growth substrate. In some embodiments, the growth substrate can be formed substantially entirely of a metal, such as a metal foil. In other embodiments, the growth substrate can include a metal surface. For example, a ceramic substrate having a metal surface coating can be used as the growth substrate in various embodiments of the present disclosure.

In various embodiments, releasing the graphene or graphene-based film or other two-dimensional material from the growth substrate can involve etching the growth substrate. In various embodiments, the operation of etching the growth substrate to affect release of the graphene or graphene-based film or other two-dimensional material can involve a dissolution process. Accordingly, the etching operation can include exposing at least the growth substrate to an etching solution. A particularly suitable etching solution for metal growth substrates, particularly copper and other transition metals, can include ammonium persulfate as the active etching component. That is, in some embodiments, etching the growth substrate can involve at least partially dissolving a metal with an ammonium persulfate etch solution. Other oxidizing etchants can also be suitable for at least partially dissolving a metal substrate according to the embodiments of the present disclosure. Illustrative examples of other suitable etchants can include etching solutions containing, for example, ferric salts (e.g., ferric chloride), cupric salts, potassium peroxymonosulfate, hydrogen peroxide-ammonia, peroxide, hydrochloric acid, acetic acid, hydrofluoric acid, nitric acid and combinations thereof. In addition, electrochemical etching may be used to release graphene, graphene-based materials or other two-dimensional materials from a metallic growth substrate.

In alternative embodiments, releasing the graphene or graphene-based film or other two-dimensional material from the growth substrate can involve delaminating the graphene or graphene-based film or other two-dimensional material from the growth substrate. Illustrative delamination processes can involve, for example, electrolytic generation of hydrogen gas between the graphene or graphene-based film and the growth substrate to promote delamination.

Figure 4:
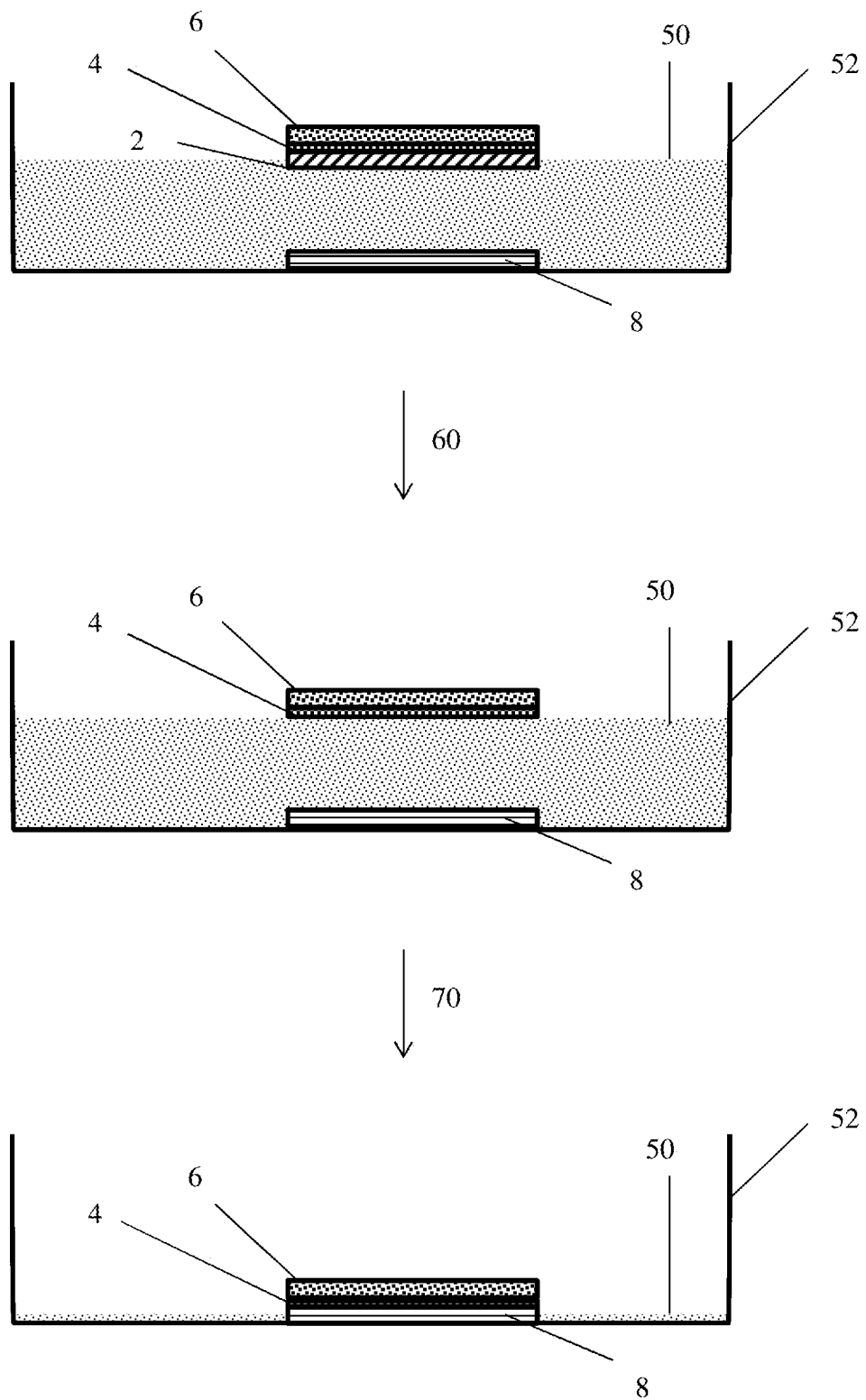
FIGS. 4 and 5 show illustrative processes whereby a graphene or graphene-based film and a porous or permeable supporting layer can be freed from a growth substrate by an etching solution and then undergo contiguous transfer to a secondary substrate.

In some embodiments, a supporting layer and a graphene or graphene-based film or other two-dimensional material can be used without another secondary substrate being present. In other instances, however, it can still be desirable to transfer the supporting layer and the graphene or graphene-based film or other two-dimensional material to a secondary substrate. In some embodiments, both the removal and transfer processes can be promoted by an etching solution and optionally another liquid. FIG. 4 shows an illustrative process whereby a graphene or graphene-based film and porous or permeable supporting layer can be freed from a growth substrate by an etching solution and then undergo transfer to a secondary substrate. As depicted in FIG. 4, etching solution 50 is provided in etching tank 52. Growth substrate 2 is placed in contact with etching solution 50. Adhered graphene or graphene-based film 4 and supporting layer 6 can also contact etching solution 50 in some embodiments. In some embodiments, growth substrate 2 and its adhered layer(s) can float on the surface of etching solution 50 by native buoyancy alone. In other embodiments, a high buoyancy material, such as a foam, can be utilized in order to promote floatation of growth substrate 2 and its adhered layer(s) on etching solution 50. The high buoyancy material can also surround growth substrate 2 so as to limit the lateral movement of graphene or graphene-based film 4 once it has been removed from growth substrate 2. As etching solution 50 affects dissolution of growth substrate 2 during operation 60, graphene or graphene-based film 4 and supporting layer 6 remain floating on etching solution 50. Thereafter, the level of etching solution 50 in etching tank 52 can be lowered to settle graphene or graphene-based film 4 and supporting layer 6 onto secondary substrate 8, as shown in operation 70. Optionally, graphene or graphene-based film 4 and supporting layer 6 can be floated to a different liquid phase lacking the active etchant (e.g., water or a water-alcohol mixture), and they can be lowered onto secondary substrate 8 in a substantially equivalent manner. Once deposited on secondary substrate 8, graphene or graphene-based film 4 can be removed utilized in various applications. Similar processes can be used to manipulate graphene or graphene-based film 4 and supporting layer 6 produced by mechanical delamination.

Figure 5:
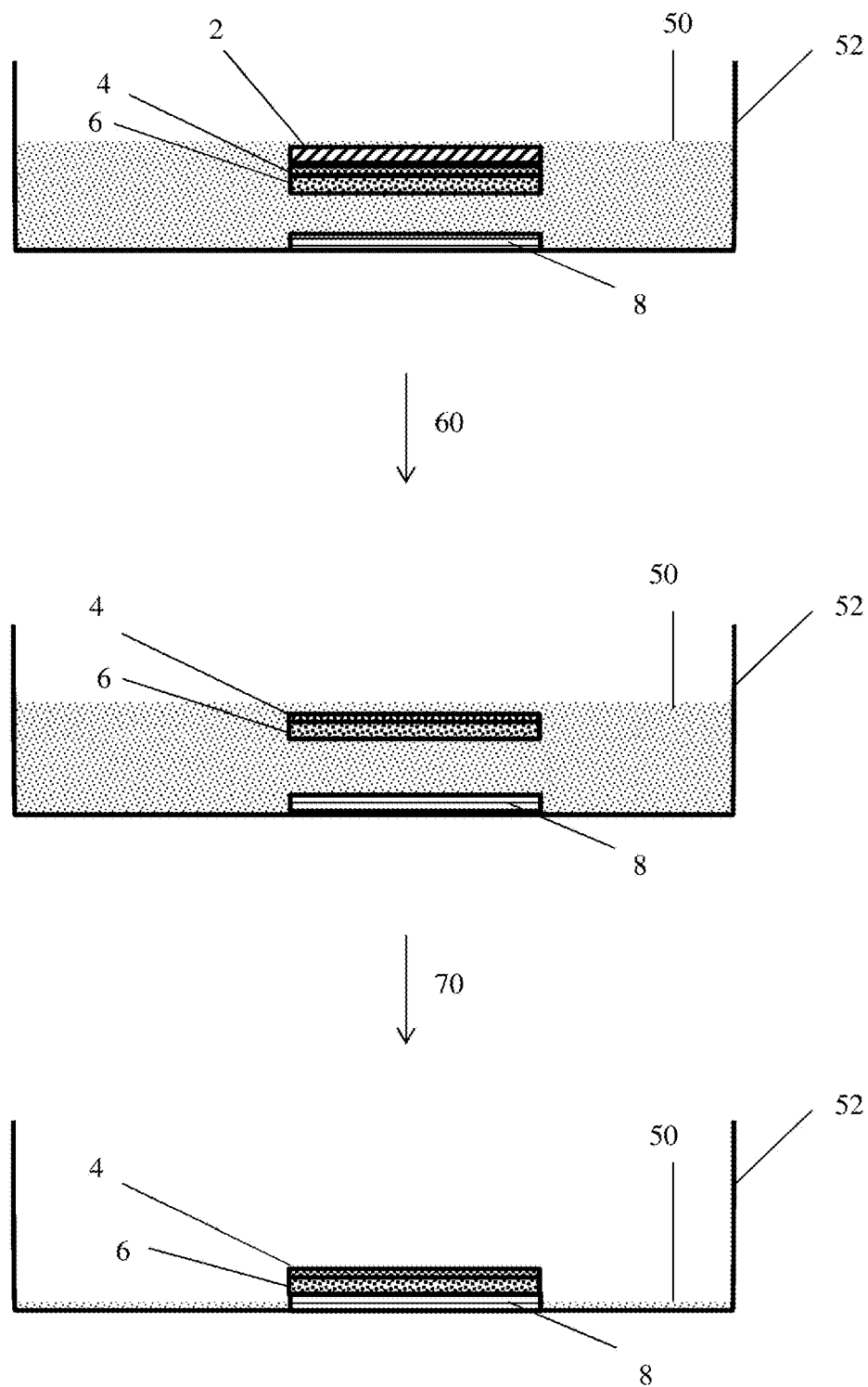

In FIG. 4, graphene or graphene-based film 4 is sandwiched between secondary substrate 8 and supporting layer 6. FIG. 5 shows a schematic of an alternative configuration in which supporting layer 6 directly contacts secondary substrate 8, with graphene or graphene-based film 4 being directed outwardly. The operations used to produce the configuration of FIG. 5 are substantially similar to those described above for FIG. 4, but they are performed on an inverted or flipped stack, i.e., where supporting layer 6 is below the two-dimensional material when viewed in cross-section. The stack may be inverted or flipped prior to release of the growth substrate or after release of the growth substrate. When the stack is inverted or flipped after release of the growth substrate, the two-dimensional material remains sufficiently supported by supporting layer 6 during the inverting or flipping operation to prevent tearing, folding or other damage to the two-dimensional material.

Accordingly, in some embodiments, processes of the present disclosure can include transferring the graphene, graphene-based material or other two-dimensional material to a secondary substrate. When used, the secondary substrate can also be porous or permeable. For example, when constructing a filtration membrane containing a perforated graphene or graphene-based film and a porous or permeable supporting layer, the secondary substrate can also be porous or permeable in order to allow fluid flow to freely take place within the stacked structure.

It is believed that any material can be used to form the secondary substrate or the supporting layer, provided that the chosen material suitably adheres to the graphene or graphene-based film or other two-dimensional material. Adhesion between the graphene or graphene-based film and/or layers of the stacked structure may be facilitated by a high degree of conformality between the layers, where the conformal contact between the layers may improve van der Waals forces, dielectric forces, covalent bonding and/or ionic bonding. The ability to generate suitable porosity in the secondary substrate and/or the supporting layer can also dictate the suitability of a particular material. Illustrative materials can include, for example, various polymers, ceramics, carbon grids, and the like.

As indicated above, the secondary substrate can desirably be omitted in various embodiments of the present disclosure. That is, a graphene or graphene-based film and its adhered supporting layer can be terminally deployed in various applications. Accordingly, when a graphene or graphene-based film and its adhered supporting layer are to be used without a secondary substrate being present, transferring operations can be omitted (e.g., operation 60 in FIGS. 4 and 5).

In various embodiments, the supporting layer of the present disclosure can have a plurality of pores therein. In some embodiments, the plurality of pores in the supporting layer can be natively introduced as the supporting layer is deposited on the graphene, graphene-based material or other two-dimensional material. In other embodiments, the plurality of pores in the supporting layer can be introduced separately after the supporting layer is deposited. In either case, processes of the present disclosure can include introducing a plurality of pores into the supporting layer. Suitable techniques for depositing or forming a porous or permeable supporting layer are discussed in greater detail hereinbelow.

In some embodiments, the supporting layer can have a "pore size gradient" throughout its thickness. "Pore size gradient", as used herein, describes a plurality of pores in a supporting layer having a diameter of each pore that increases or decreases along an imaginary line through the center of the pore. For example, a supporting layer may have a pore size gradient that decreases or narrows nearer the surface of a two-dimensional material or along a direction of fluid or gas flow. In such an embodiment, a pore size of the supporting layer is smaller nearer the surface of a two-dimensional material than at an opposite side of the supporting layer.

In some embodiments, the supporting layer can have a "porosity gradient" throughout its thickness. "Porosity gradient", as used herein, describes a change, along a dimension of the supporting layer, in the "porosity" or ratio of the volume of all pores in a layer to the volume of the whole layer. For example, throughout the thickness of the porous supporting layer, the porosity can change in a regular or irregular manner. Generally, a porosity gradient decreases from one face of the supporting layer to the other. For example, the lowest porosity in the supporting layer can be located spatially closest to the graphene or graphene-based film or other two-dimensional material, and the highest porosity can be located farther away. A porosity gradient of this type may be achieved by electrospinning fibers onto a two-dimensional material such that a fiber mat is denser near the surface of the two-dimensional material and less dense further from the surface of the two-dimensional material.

In some embodiments, the supporting layer can have a "permeability gradient" throughout its thickness. "Permeability gradient", as used herein, describes a change, along a dimension of the supporting layer, in the "permeability" or rate of flow of a liquid or gas through a porous material. For example, throughout the thickness of the supporting layer, the permeability can change in a regular or irregular manner. Generally, a permeability gradient decreases from one face of the supporting layer to the other. For example, the lowest permeability in the supporting layer can be located spatially closest to the graphene or graphene-based film or other two-dimensional material, and the highest permeability can be located farther away. Those of skill in the art will understand that permeability of a layer may increase or decrease without pore diameter or porosity changing, e.g., in response to chemical functionalization, applied pressure or other factors.

In various embodiments, the thickness and structure of the supporting layer can be chosen to convey a desired degree of structural support (e.g., to prevent tearing and/or buckling) to the graphene or graphene-based film or other two-dimensional material following its removal from a growth substrate. In various embodiments, the supporting layer can have a thickness of about 1 mm or less. In more particular embodiments, a thickness of the supporting layer can range between about 500 nm and about 100 μm, or between about 1 μm and about 50 μm, or between about 1 μm and about 10 μm.

In some embodiments, both the graphene or graphene-based film or other two-dimensional material and the supporting layer can include a plurality of pores therein. When both the two-dimensional material and the supporting layer contain pores, the pores in the two-dimensional material are generally smaller than the pores in the supporting layer. For example, in some embodiments, the supporting layer can contain pores that are about 1 μm in size or larger and the graphene or graphene-based film or other two-dimensional material can contain pores that are about 10 nm in size or smaller. Accordingly, in various embodiments, the sizes or diameters of pores in the graphene or graphene-based film or other two-dimensional material are at least about 10-fold smaller than are the sizes or diameters of pores in the supporting layer, and in other embodiments, the sizes or diameters of pores in the graphene or graphene-based film or other two-dimensional material are at least about 100-fold smaller than are the sizes or diameters of pores in the supporting layer.

The technique used for introducing a plurality of pores into the graphene or graphene-based film or other two-dimensional material is not considered to be particularly limited and can include various chemical and physical perforation techniques. Suitable perforation techniques can include, for example, particle bombardment, chemical oxidation, lithographic patterning, or any combination thereof.

In some embodiments, perforation of the graphene or graphene-based film or other two-dimensional material to produce pores therein can occur in conjunction with establishing pores in the supporting layer. In some or other embodiments, a perforation process can be applied to the graphene or graphene-based film or other two-dimensional material before depositing a supporting layer thereon. In some embodiments, pores can be introduced in the graphene, graphene-based material or other two-dimensional material while it is adhered to its growth substrate. In still other embodiments, the graphene or graphene-based film or other two-dimensional material can be perforated after releasing the graphene or graphene-based film or other two-dimensional material from its growth substrate, such as through etching the growth substrate.

In various embodiments, the supporting layer can be formed from a porous or permeable polymer or a porous or permeable ceramic material. Suitable techniques for depositing supporting layers formed from these materials are discussed below.

Porous or permeable polymers can be deposited or formed by various processes used to create membranes for gas separation or microfiltration applications. Suitable techniques for depositing or forming a porous or permeable polymer on the graphene or graphene-based film or other two-dimensional material can include casting or depositing a polymer solution onto the graphene or graphene-based film or other two-dimensional material using a method such as spin-coating, curtain coating, doctor-blading, immersion coating, electro spinning, or other like techniques. Suitable polymers for forming a porous or permeable supporting layer on the graphene or graphene-based film or other two-dimensional material are not believed to be particularly limited and can include, for example, polysulfones, polyethersulfones (PES), polyvinylidine fluoride (PVDF), polypropylene, cellulose acetate, polyethylene, polycarbonate, fluorocarbon polymers such as polytetrafluoroethylene, and mixtures and block co-polymers thereof. Further disclosure regarding these techniques and others follows hereinafter.

Figure 6:
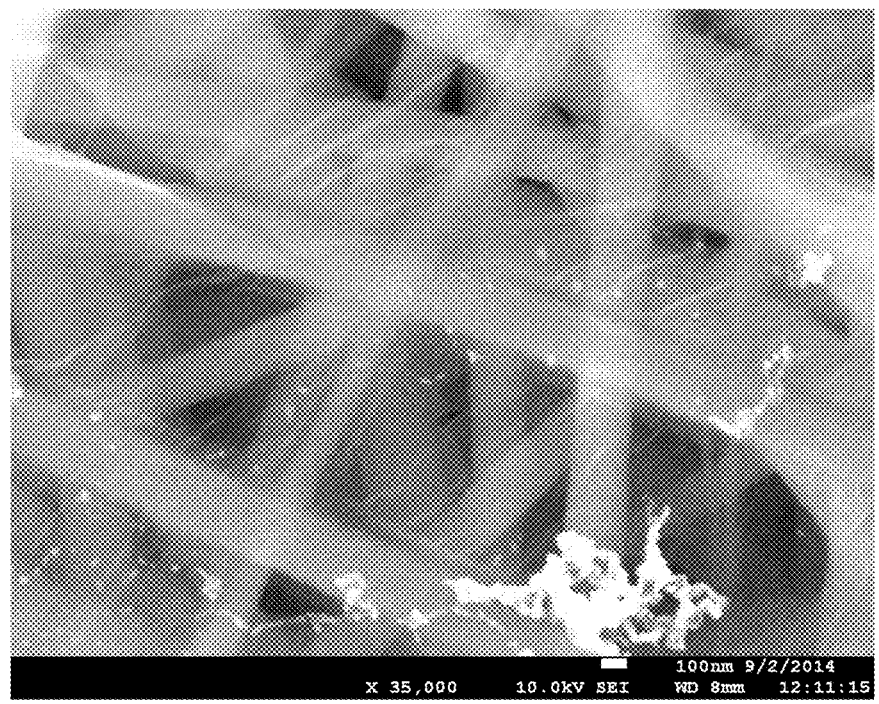
FIG. 6 shows an illustrative SEM image of a graphene or graphene-based film having a plurality of electrospun PVDF fibers deposited thereon.

In some embodiments, the process for forming a supporting layer on the graphene or graphene-based film or other two-dimensional material can include an electrospinning process, in which a plurality of polymer filaments are randomly laid down to form a porous mat on the graphene or graphene-based film or other two-dimensional material. The mat can have pores defined therein as the filaments of the supporting layer are deposited. FIG. 6 shows an illustrative SEM image of a graphene or graphene-based film deposited upon a plurality of electrospun PVDF fibers. The electrospinning process can constitute a wet electrospinning process in some embodiments or a dry electrospinning process in other embodiments. In dry electrospinning processes, the spun fibers of the supporting layer can remain as essentially discrete entities once deposited. In contrast, wet electro spinning processes can deposit the spun fibers such that they are at least partially fused together when deposited. Accordingly, considerable flexibility can be realized in the size and morphology of the fiber mat deposited by an electrospinning process. These factors can impact the degree of porosity and the effective pore size of the supporting layer. The thickness of the supporting layer can also impact the effective porosity. In some embodiments, electrospinning processes can be adapted to produce gradient porosity in the supporting layer, as discussed above. The porosity of the supporting layer can include effective porosity values up to about 95% with a broad range of pore sizes. In some embodiments, a single spinneret can be moved to lay down a mat of the supporting layer. In other embodiments, multiple spinnerets can be used for this purpose. In some embodiments, the spun fibers in an electro spun supporting layer can have a fiber diameter ranging between about 10 nm and about 1 µm, or between about 10 nm and about 500 nm, or between about 20 nm and about 100 nm. Although the effective pore size can be large and variable in electro spun fiber supporting layers, the fibers can still readily provide mechanical stabilization to the graphene or graphene-based film or other two-dimensional material following release from its growth substrate.

In some embodiments, the supporting layer can be deposited by a solution-coating process onto the graphene or graphene-based film or other two-dimensional material, particularly for a polymer film supporting layer. Illustrative solution-coating processes can include dip coating processes, spin coating processes, spray coating processes, the like, and any combination thereof. A sacrificial material can be included in the coating solution or can be co-deposited with the coating solution so that the sacrificial material is present in the as-deposited polymer film. The sacrificial material can constitute a degradable material, removable material or a dissolvable material that is degraded, removed or dissolved after depositing the supporting layer in order to introduce a plurality of pores therein. As used herein, the term "degradable" refers to both chemical and physical degradation processes, such as chemical breakdown, melting and the like. The size of the sacrificial material can be chosen to produce pores having a desired size within the supporting layer upon removal of the sacrificial material. In general, any sacrificial material can be used provided that its degradation, removal or dissolution does not also remove or substantially damage the material of the supporting layer. Illustrative sacrificial materials can include, for example, soluble salts, soluble organic compounds, degradable polymer particulates, waxes, low melting alloys, and the like. In some embodiments of this approach, the pores within the supporting layer can be opened while the graphene or graphene-based film or other two-dimensional material is adhered to its growth substrate. In other embodiments, the pores can be opened after or concurrently with release of the graphene, graphene-based material or other two-dimensional material from its growth substrate. Accordingly, in various embodiments, solvent exchange or thermal annealing processes can be used to open the pores in the supporting layer. Dissolution-based processes for defining pores in the supporting layer are believed to be more easily conducted than are complete removal of a sacrificial supporting layer, because an easily dissolvable, removable or degradable material can be included within a more robust supporting layer material.

In alternative embodiments, a sacrificial material can be deposited on the surface of the graphene or graphene-based film or other two-dimensional material before solution-phase deposition of the supporting layer. So long as the thickness of the deposited layer is such that the sacrificial material remains accessible, a plurality of pores can be defined in the supporting layer. For example, the thickness of the supporting layer can be adjusted to be smaller than an effective diameter of the sacrificial material such that pores are defined in the supporting layer upon removal of the sacrificial material.

In still other alternative embodiments for forming a supporting layer, non-degradable particulates can be co-deposited with a polymer in order to increase the fractional free volume between polymer chains. By increasing the fractional free volume, the effective permeability of the supporting layer can be increased by establishing a solution-diffusion layer but without defining discrete pores. An illustrative example of such supporting layers include those formed from NAFION (a sulfonated tetrafluoroethylene copolymer, which is selectively permeable toward movement of cations). Such supporting layers can still be desirable for use in conjunction with a perforated graphene or graphene-based film or other perforated two-dimensional material according to the various embodiments of the present disclosure.

Still other processes can be used for depositing the supporting layer in porous or permeable form upon the graphene or graphene-based film or other two-dimensional material. Particularly for non-polymeric supporting layers. In some embodiments, atomic layer deposition (ALD), chemical vapor deposition (CVD), physical vapor deposition (PVD) or other known deposition techniques can be used to deposit a porous or permeable supporting layer formed from a ceramic material. For example, an alumina porous or permeable supporting layer can be formed by ALD. A porous or permeable supporting layer deposited by ALD can have up to about 200 individual layers and can range from about 10 nm to about 20 nm in thickness. In some embodiments, a sacrificial material, such as those discussed above, can be used to introduce a plurality of pores into a supporting layer deposited by ALD.

In still other embodiments, various lithographic techniques can be used to pattern a plurality of pores in an existing supporting layer that is originally substantially non-porous. Patterning can be ordered or random in nature. Suitable lithographic techniques will be familiar to one having ordinary skill in the art. When conducted following removal of the two-dimensional material from the growth substrate, lithographic generation of pores in the supporting layer can be conducted from the top-side or bottom-side of the graphene or graphene-based film (e.g., see FIG. 2). Top-side generation of pores in the supporting layer can also introduce a plurality of pores of like size in the two-dimensional material if the penetration depth is sufficiently great, or pores can be generated in the supporting layer only if the penetration depth is not sufficient to break through the two-dimensional material. Bottom-side generation of pores in the supporting layer, in contrast, can result in pore generation in both the two-dimensional material and the supporting layer, since the lithographic beam necessarily traverses the two-dimensional material in the course of penetrating the supporting layer.

In still other embodiments, the supporting layer can include a perforated graphene, graphene-based material or other perforated two-dimensional material having pores that are larger than those in the perforated graphene, graphene-based material or other perforated two-dimensional material onto which the supporting layer is deposited. In a specific example, a lithographic mask can be applied to graphene or graphene-based material on its growth substrate, and a plurality of large perforations (e.g., about 100 nm in size or larger) can be densely defined in the graphene or graphene-based material. Thereafter, the lithographic mask can be left on the graphene or graphene-based material and the growth substrate can be removed, thereby providing perforated graphene or graphene-based material supported by the lithographic mask. The perforated graphene or graphene-based material supported by the lithographic mask can then be contacted graphene surface-to-graphene surface in order to define a hybrid supporting layer for the graphene or graphene-based material containing smaller pores. Through van der Waals forces, good adhesion can occur between the two graphene or graphene-based material surfaces. Upon removal of the growth substrate from the perforated graphene or graphene-based material containing smaller pores, the lithographic mask can provide mechanical support to the composite structure as described herein.

In some embodiments, the supporting layer, the secondary substrate (if present), or both can be functionalized. Specifically, the supporting layer and/or the secondary substrate can bear functionality that increases the compatibility and degree of adhesion to the graphene or graphene-based film or other two-dimensional material. In some embodiments, the supporting layer and/or the secondary substrate can bear functional groups that promote covalent bond formation to functional groups in the graphene or graphene-based film or other two-dimensional material. Residual functional groups present in graphene or graphene-based material can include, for example, carboxylic acids, alcohols, epoxides, carbonyls, and the like. Accordingly, covalent bond formation to the graphene or graphene-based material can involve the formation of moieties such as, for example, esters, ethers, aldehydes, alcohols, amides, carbonyl addition compounds, epoxide addition compounds, and the like.

Accordingly, in some embodiments, processes described herein can include providing a graphene or graphene-based film adhered to a growth substrate, perforating the film to introduce a plurality of pores therein, depositing a supporting layer on the film while the film is adhered to the growth substrate, and releasing the film from the growth substrate. The graphene or graphene-based film remains in contact with the supporting layer following release of the film from the growth substrate. The growth substrate may comprise a metal. The supporting layer also may comprise a plurality of pores.

In some embodiments, the processes described herein can include performing a filtration operation with a composite structure containing a graphene or graphene-based film and the supporting layer. The filtration operation can include ultrafiltration, microfiltration, nanofiltration, molecular filtration, reverse osmosis or any combination thereof. The material being filtered by the perforated graphene or graphene-based material can constitute any material that allows the desired filtrate to pass through the pores within the perforated graphene or graphene-based material while retaining the bulk material on an opposite side of the graphene or graphene-based material. Materials that can be filtered using graphene or graphene-based materials comprising nanometer or subnanometer-sized pores include, for example, ions, small molecules, viruses, proteins, and the like. In some embodiments, the supported graphene or graphene-based material described herein can be used in water desalination, gap-phase separation or water purification applications.

Accordingly, in various embodiments, the combination of a perforated graphene or graphene-based material and a supporting layer, optionally in combination with a porous or permeable secondary substrate, can constitute at least a portion of a filtration membrane. Illustrative configurations for a filtration membrane containing perforated graphene or graphene-based material and a supporting layer containing pores are depicted in the FIGURES herein.

Although the invention has been described with reference to the disclosed embodiments, those skilled in the art will readily appreciate that these are only illustrative of the invention. It should be understood that various modifications can be made without departing from the spirit of the invention. The invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomer and enantiomer of the compound described individually or in any combination. One of ordinary skill in the art will appreciate that methods, device elements, starting materials and synthetic methods other than those specifically exemplified can be employed in the practice of the invention without resort to undue experimentation. All art-known functional equivalents, of any such methods, device elements, starting materials and synthetic methods are intended to be included in this invention.

Whenever a range is given in the specification, for example, a temperature range, a time range, or a composition range, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The preceding definitions are provided to clarify their specific use in the context of the invention.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claims.

What is claimed is the following:

1. A membrane comprising:
    a first layer comprising 1 to 5 layers of a porous graphene or a porous graphene-based material formed by chemical vapor deposition that has been subjected to nanoparticle bombardment;
    a supporting layer in contact with the first layer that comprises a plurality of filaments formed by a wet electrospinning process or a dry electrospinning process; and
    a secondary substrate comprising a porous polymer,
    wherein the first layer is positioned between the secondary substrate and the supporting layer or the supporting layer is positioned between the first layer and the secondary substrate.

2. A membrane comprising:
    a first layer comprising 2 to 5 layers of a porous graphene or a porous graphene-based material;
    a porous or permeable supporting layer different from the first layer, and
    a third layer comprising a porous or permeable secondary substrate,
    wherein the first layer is positioned between the secondary substrate and the supporting layer or the supporting layer is positioned between the first layer and the secondary substrate and
    wherein the supporting layer comprises filaments or fibers having a diameter of less than 1 µm.

3. The membrane of claim 2, wherein the graphene or the graphene-based material comprises 2 layers of graphene or graphene-based material.

4. The membrane of claim 2, wherein the graphene or the graphene-based material is perforated via nanoparticle bombardment.

5. The membrane of claim 2, wherein the graphene or the graphene-based material comprises at least 90% graphene.

6. The membrane of claim 2, wherein the graphene or the graphene-based material is in contact with the supporting layer.

7. The membrane of claim 2, wherein the graphene or the graphene-based material is formed by chemical vapor deposition.

8. The membrane of claim 2, wherein the filaments are polymer filaments formed by a wet electrospinning process or a dry electrospinning process.

9. The membrane of claim 2, wherein the first layer is positioned between the secondary substrate and the supporting layer.

10. The membrane of claim 2, wherein the supporting layer is positioned between the first layer and the secondary substrate.

11. The membrane of claim 2, wherein the supporting layer comprises pores.

12. The membrane of claim 11, wherein porous supporting layer has a pore size gradient.

13. The membrane of claim 2, wherein the graphene or the graphene-based material is perforated with pores and the supporting layer comprises pores, wherein the pores in the graphene or the graphene-based material are smaller than the pores in the supporting layer.

14. The membrane of claim 2, wherein the supporting layer comprises a random mat of fibers, the fibers having a diameter between about 10 nm and about 500 nm.

15. The membrane of claim 2, wherein the supporting layer the supporting has a thickness between about 500 nm and about 10 μm.

16. The membrane of claim 2, wherein the supporting layer has a thickness of 1 mm or less.

17. The membrane of claim 2, wherein the graphene or graphene-based film are at least 10-fold smaller than the plurality of pores in the supporting layer.

18. The membrane of claim 2, wherein the filaments or fibers have a diameter of less than 100 nm.

19. A membrane comprising:
   a first layer comprising 2 to 5 layers of a porous two-dimensional material;
   a supporting layer in contact with the first layer that comprises a plurality of filaments formed by a wet electrospinning process or a dry electrospinning process; and
   a secondary substrate comprising a porous polymer,
   wherein the first layer is positioned between the secondary substrate and the supporting layer or the supporting layer is positioned between the first layer and the secondary substrate.

20. The membrane of claim 2, wherein the supporting layer comprises a random layer of filaments or fibers having a diameter of less than 500 nm.

* * * * *